United States Patent
Gurelli et al.

(10) Patent No.: US 11,963,016 B2
(45) Date of Patent: Apr. 16, 2024

(54) BEAM SQUINT MITIGATION METHODS FOR A REFLECTED BEAM FROM AN INTELLIGENT REFLECTING SURFACE

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Raju Hormis, New York, NY (US); Tao Luo, San Diego, CA (US); Navid Abedini, Basking Ridge, NJ (US); Ozge Koymen, Princeton, NJ (US); Farideddin Fayazbakhsh, Chatham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/457,998

(22) Filed: Dec. 7, 2021

(65) Prior Publication Data

US 2023/0180020 A1    Jun. 8, 2023

(51) Int. Cl.
*H04W 16/28* (2009.01)
*H04W 40/06* (2009.01)
*H04W 72/0453* (2023.01)

(52) U.S. Cl.
CPC ........... *H04W 16/28* (2013.01); *H04W 40/06* (2013.01); *H04W 72/0453* (2013.01)

(58) Field of Classification Search
CPC . H04W 16/28; H04W 40/06; H04W 72/0453; H01Q 3/46; H01Q 15/148; G01S 5/00; H04B 7/04013
See application file for complete search history.

(56) References Cited

U.S. PATENT DOCUMENTS 11,546,022 B2 *  1/2023  Dunna ............... H04B 7/04013
11,677,145 B1 *  6/2023  Sharma ............... H01Q 3/2682
                                                      342/372

(Continued)

FOREIGN PATENT DOCUMENTS

CN    111986741 A  * 11/2020
CN    113225276 A  *  8/2021    ............. H04B 7/145

(Continued)

OTHER PUBLICATIONS

Elmossallamy M.A., et al., "Reconfigurable Intelligent Surfaces for Wireless Communications: Principles, Challenges, and Opportunities", IEEE Transactions on Cognitive Communications and Networking, arXiv:2005.00938v1 [eess.SP], May 2, 2020, pp. 1-12.

(Continued)

*Primary Examiner* — Yu-Wen Chang
(74) *Attorney, Agent, or Firm* — Procopio, Cory, Hargreaves & Savitch

(57) ABSTRACT

A node may identify a node configuration including one or more surface phase configurations associated with the node. In one configuration, the node may receive, from the base station, an indication of the node configuration. In another configuration, the node may select, at a controller associated with the node, the node configuration. The one or more surface phase configurations may be based on a wavelength corresponding to a center of a BWP associated with the one or more wireless signals or a wavelength corresponding to a center of a resource allocation associated with the one or more wireless signals. The node may forward, from a base station to a UE, or from the UE to the base station, one or (Continued)

more wireless signals. The forwarded one or more wireless signals may be associated with a beam squint less than a first threshold.

30 Claims, 15 Drawing Sheets

(56) References Cited

U.S. PATENT DOCUMENTS

| | | | |
|---|---|---|---|
| 2022/0014935 A1* | 1/2022 | Haija | H04L 5/0048 |
| 2022/0052764 A1 | 2/2022 | Medra et al. | |
| 2022/0060238 A1 | 2/2022 | Jassal et al. | |
| 2022/0216908 A1* | 7/2022 | Choi | H04B 7/0617 |
| 2022/0231753 A1* | 7/2022 | Bengtsson | H04B 7/145 |
| 2022/0344826 A1* | 10/2022 | Chowdhury | H01Q 19/18 |
| 2023/0022225 A1* | 1/2023 | Gunturu | H04B 7/04013 |
| 2023/0030324 A1* | 2/2023 | Ali | H04B 7/0617 |
| 2023/0043800 A1* | 2/2023 | Khojastepour | H04B 7/10 |
| 2023/0047993 A1* | 2/2023 | Jian | H04B 7/145 |
| 2023/0048721 A1 | 2/2023 | Gurelli | |
| 2023/0051630 A1 | 2/2023 | Gurelli | |
| 2023/0063645 A1 | 3/2023 | Gurelli et al. | |
| 2023/0208479 A1 | 6/2023 | Wang et al. | |
| 2023/0266457 A1 | 8/2023 | Gurelli et al. | |

FOREIGN PATENT DOCUMENTS

| | | | |
|---|---|---|---|
| CN | 113645163 A * | 11/2021 | |
| JP | 6559737 B2 | 8/2019 | |
| KR | 20200010151 A | 1/2020 | |
| WO | 2019045756 A1 | 3/2019 | |
| WO | WO-2021223863 A1 * | 11/2021 | H04B 7/0482 |
| WO | 2022063435 A1 | 3/2022 | |
| WO | 2022073618 A1 | 4/2022 | |

OTHER PUBLICATIONS

Tang W., et al., "Wireless Communications with Reconfigurable Intelligent Surface: Path Loss Modeling and Experimental Measurement", IEEE Transactions on Wireless Communications, arXiv:1911.05326v2 [eess.SP], Sep. 14, 2020, pp. 1-32, https://arxiv.org/pdf/1911.05326.pdf.

Wu Q., et al., "cdma2000 Highly Detectable Pilot", IEEE International Conference on Communications Workshops, 2008. ICC Workshops, IEEE, Piscataway, NJ, USA, May 19, 2008 (May 19, 2008), pp. 16-20, XP031265196, ISBN: 978-1-4244-2052-0, p. 1, Left-Hand Column, Line 8—p. 1, Right-Hand Column, Line 31, https://ieeexplore.ieee.org/abstract/document/4531856.

Wu Q., et al., "Intelligent Reflecting Surface Aided Wireless Communications: A Tutorial", IEEE Transactions on Communications, arXiv:2007.02759v2 [cs.IT], Jul. 7, 2020, pp. 1-74, https://arxiv.org/pdf/2007.02759v2.pdf.

Wu Q., et al., "Towards Smart and Reconfigurable Environment: Intelligent Reflecting Surface Aided Wireless Network", IEEE Communications Magazine, IEEE Service Center, Piscataway, US, vol. 58, No. 1, Jan. 1, 2020 (Jan. 1, 2020), XP011768215, pp. 106-112, ISSN: 0163-6804, DOI: 10.1109/MCOM.001.1900107 [retrieved on Jan. 24, 2020] abstract pp. 106-110 figures 1, 2.

Zheng B., et al., "Intelligent Reflecting Surface-Enhanced OFDM: Channel Estimation and Reflection Optimization", IEEE Wireless Communications Letters, vol. 9, No. 4, Apr. 2020, pp. 1-5, arXiv:1909.03272v3 [cs.IT] [Jan. 29, 2020], https://arxiv.org/pdf/1909.03272.pdf.

* cited by examiner

BEAM SQUINT MITIGATION METHODS FOR A REFLECTED BEAM FROM AN INTELLIGENT REFLECTING SURFACE

TECHNICAL FIELD

The present disclosure relates generally to communication systems, and more particularly, to mitigation of beam squint associated with an intelligent reflecting surface (IRS)

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a node. The apparatus may identify a node configuration including one or more surface phase configurations associated with the node. The apparatus may forward, from a base station to a user equipment (UE), or from the UE to the base station, one or more wireless signals. The forwarded one or more wireless signals may be associated with a beam squint less than a first threshold.

In an aspect of the disclosure, a method, a computer-readable medium, and an apparatus are provided. The apparatus may be a base station. The apparatus may transmit, to a node, an indication of a node configuration including one or more surface phase configurations associated with the node. The apparatus may communicate with a UE via the node based on one or more wireless signals reflected from the node. The reflected one or more wireless signals may be associated with a beam squint less than a first threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
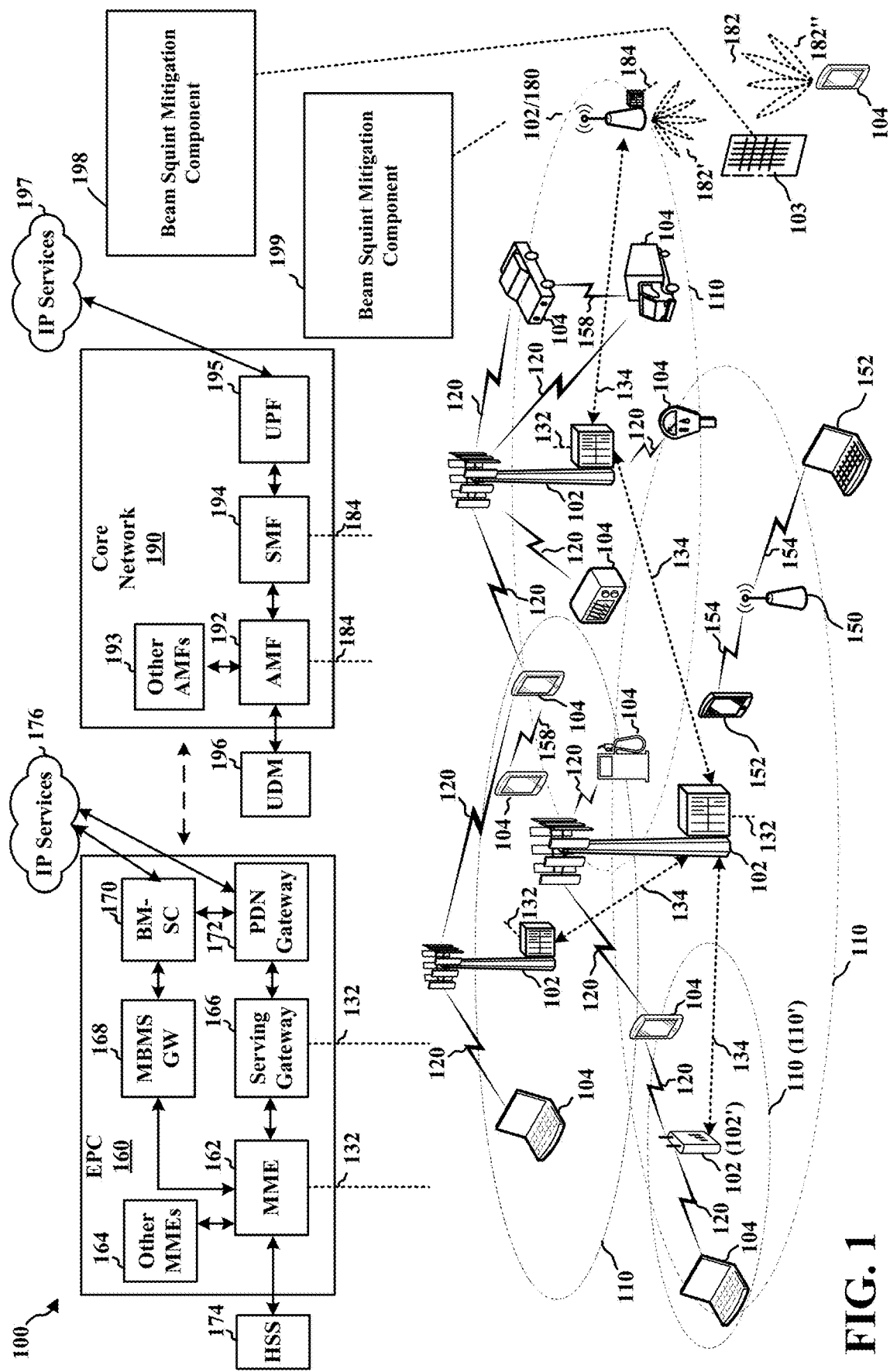
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the node (IRS) 103 may include a beam squint mitigation component 198 that may be configured to identify a node configuration including one or more surface phase configurations associated with the node. The beam squint mitigation component 198 may be configured to forward, from a base station to a UE, or from the UE to the base station, one or more wireless signals. The forwarded one or more wireless signals may be associated with a beam squint less than a first threshold. In certain aspects, the base station 180 may include a beam squint mitigation component 199 that may be configured to transmit, to a node, an indication of a node configuration including one or more surface phase configurations associated with the node. The beam squint mitigation component 199 may be configured to communicate with a UE via the node based on one or more wireless signals reflected from the node. The reflected one or more wireless signals may be associated with a beam squint less than a first threshold. Although the following description may be focused on 5G NR, the concepts described herein may be applicable to other similar areas, such as LTE, LTE-A, CDMA, GSM, and other wireless technologies.

Figure 2:
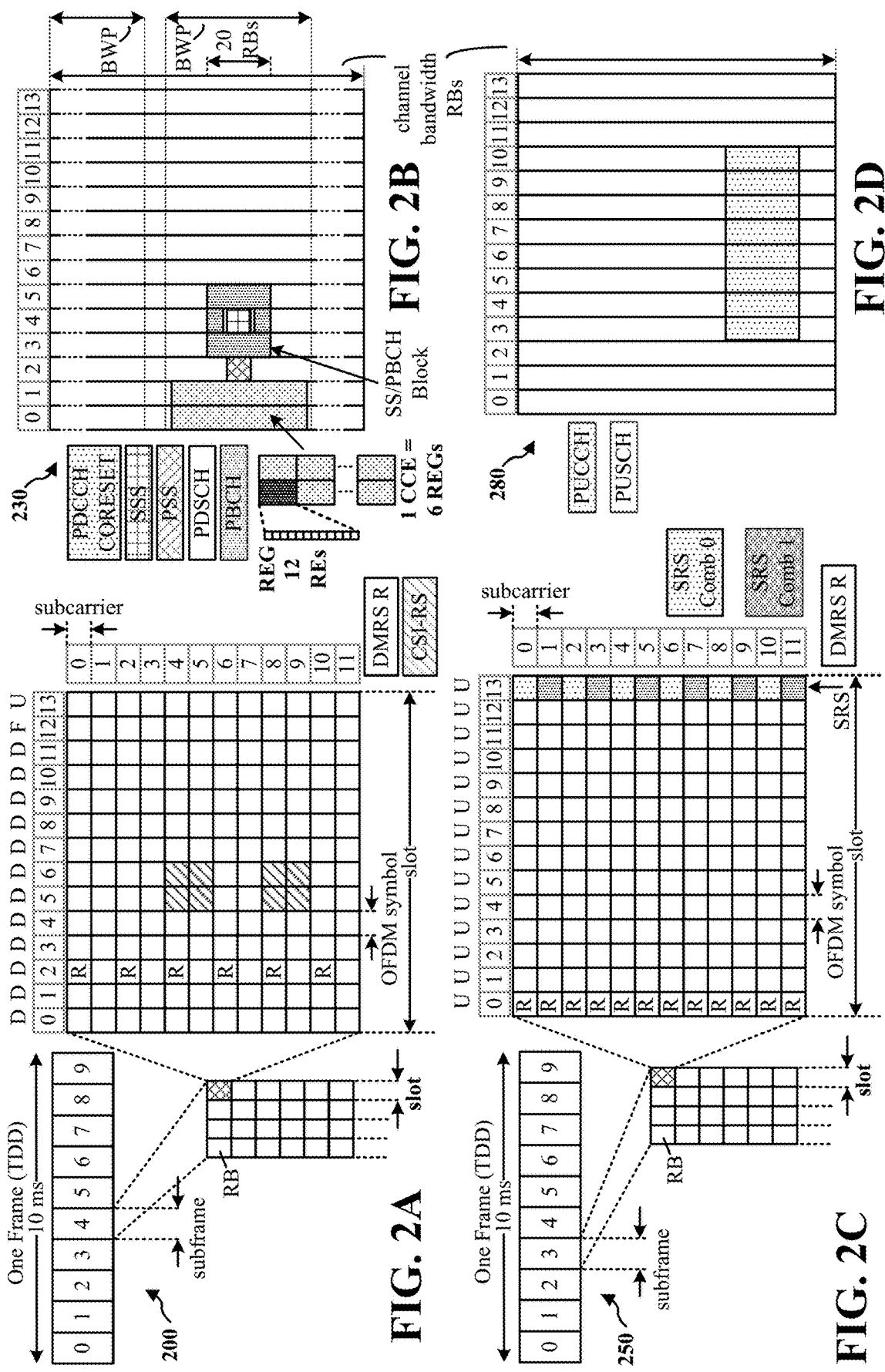
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
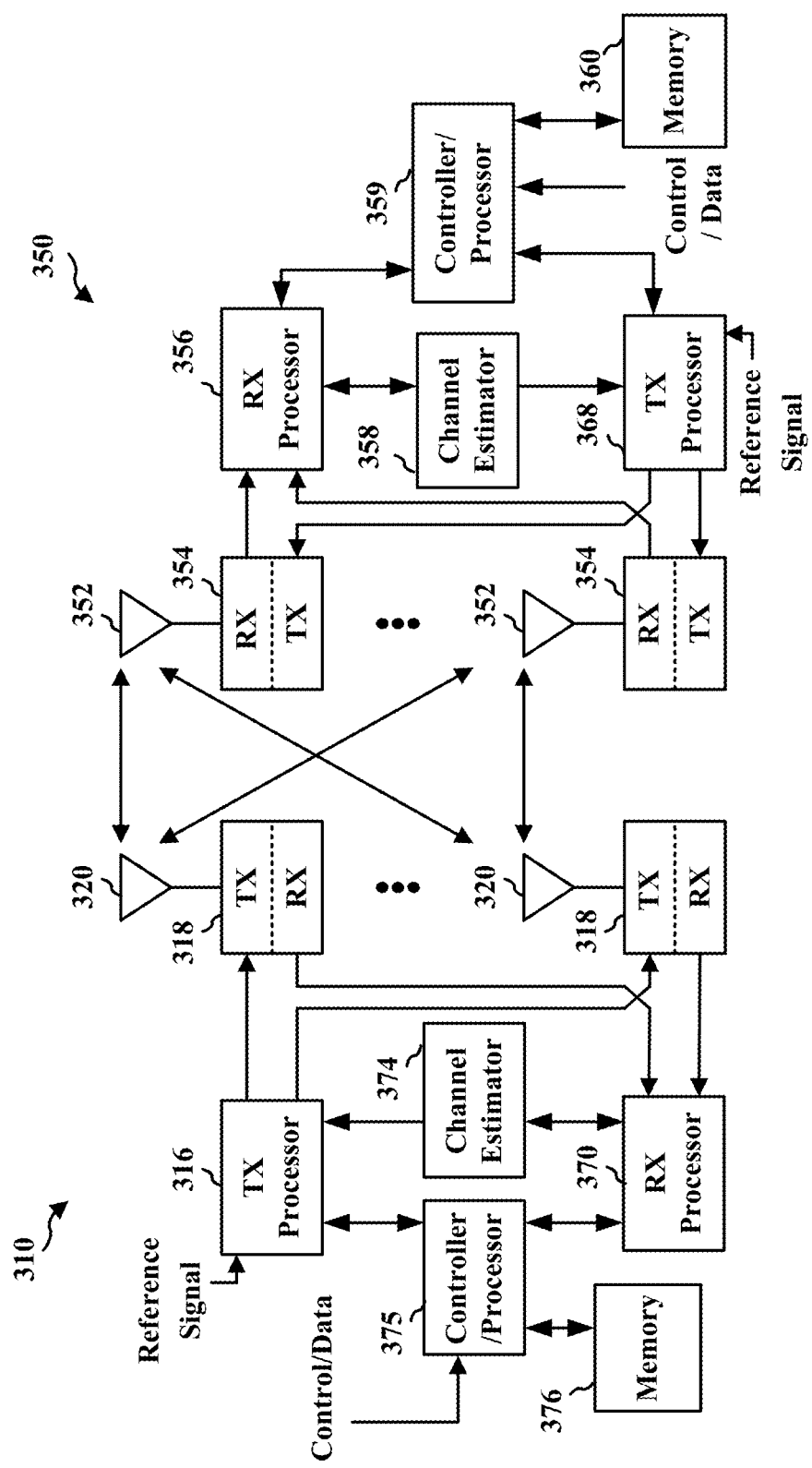
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 199 of FIG. 1.

Figure 4:
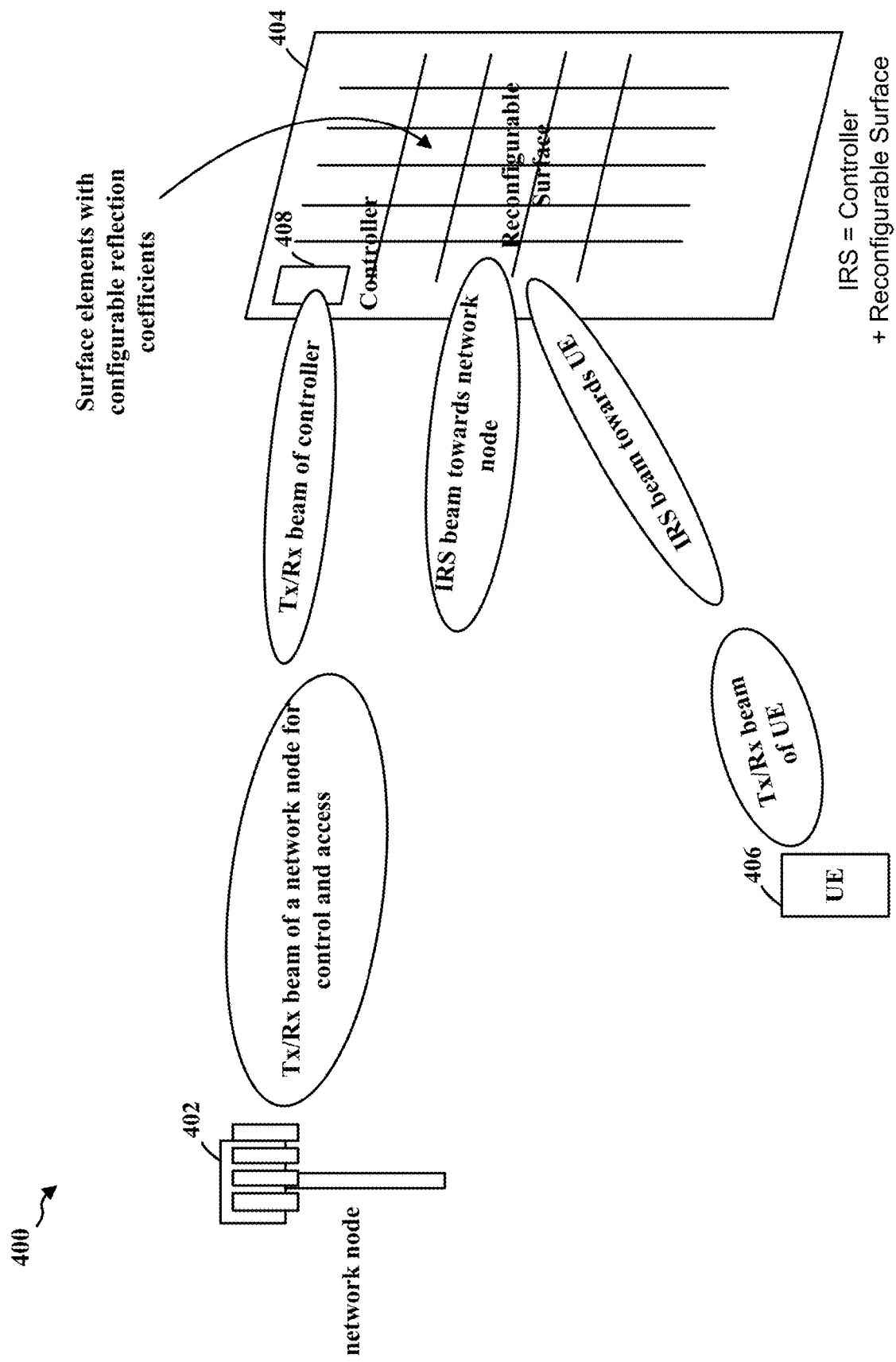
FIG. 4 is a diagram illustrating an environment 400 in which aspects may be practiced. An IRS 404 may include a surface with densely packed small surface elements.

FIG. 4 is a diagram illustrating an environment 400 in which aspects may be practiced. An IRS 404 may include a surface with densely packed small surface elements. Each surface element may have a controllable reflection coefficient. By adjusting the reflection coefficient, the phase shift between the incident and reflected rays to and from the surface element, respectively, may be controlled. The IRS 404 may be controlled by the controller 408, which may be configured based on an IRS configuration message received from the network node 402. Depending on the implementation, various forms of non-ideal effects may take place. For example, the phase shift may have a limited range, or there may be a gain variation that depends on the phase shift. Depending on the implementation, the surface elements may also be referred to as metaatoms.

When the surface phase (e.g., the phases of the surface elements) is properly set, the beam from the network node 402 may be reflected by the IRS 404 toward the UE 406 in the downlink. Conversely, the beam from the UE 406 may be reflected by the IRS 404 toward the network node 402 in the uplink. Accordingly, the IRS 404 may help to reduce the pathloss and avoid blockages in the line-of-sight (LOS) propagation. The network node 402 may be any of a base station, a remote radio head (RRH), a repeater, etc. Although herein aspects may be described in relation to 5G and mmW bands, the aspects may be equally applicable to other technologies such as 4G LTE, IEEE 802.11 WIFI, or future generations of technologies including beyond 5G, 6G, etc., and to other bands such as the sub-6 GHz bands, terahertz bands, etc.

An IRS (e.g., the IRS 404) may implement a focusing operation to beamform toward a UE (e.g., the UE 406), where the phases of received rays may align. Unlike conventional beamforming, focusing may take into account the radial distance of the UE from the IRS, in addition to the azimuth and the elevation of the UE. Focusing may be achieved by setting the surface phase of the IRS in a particular way.

Figure 5:
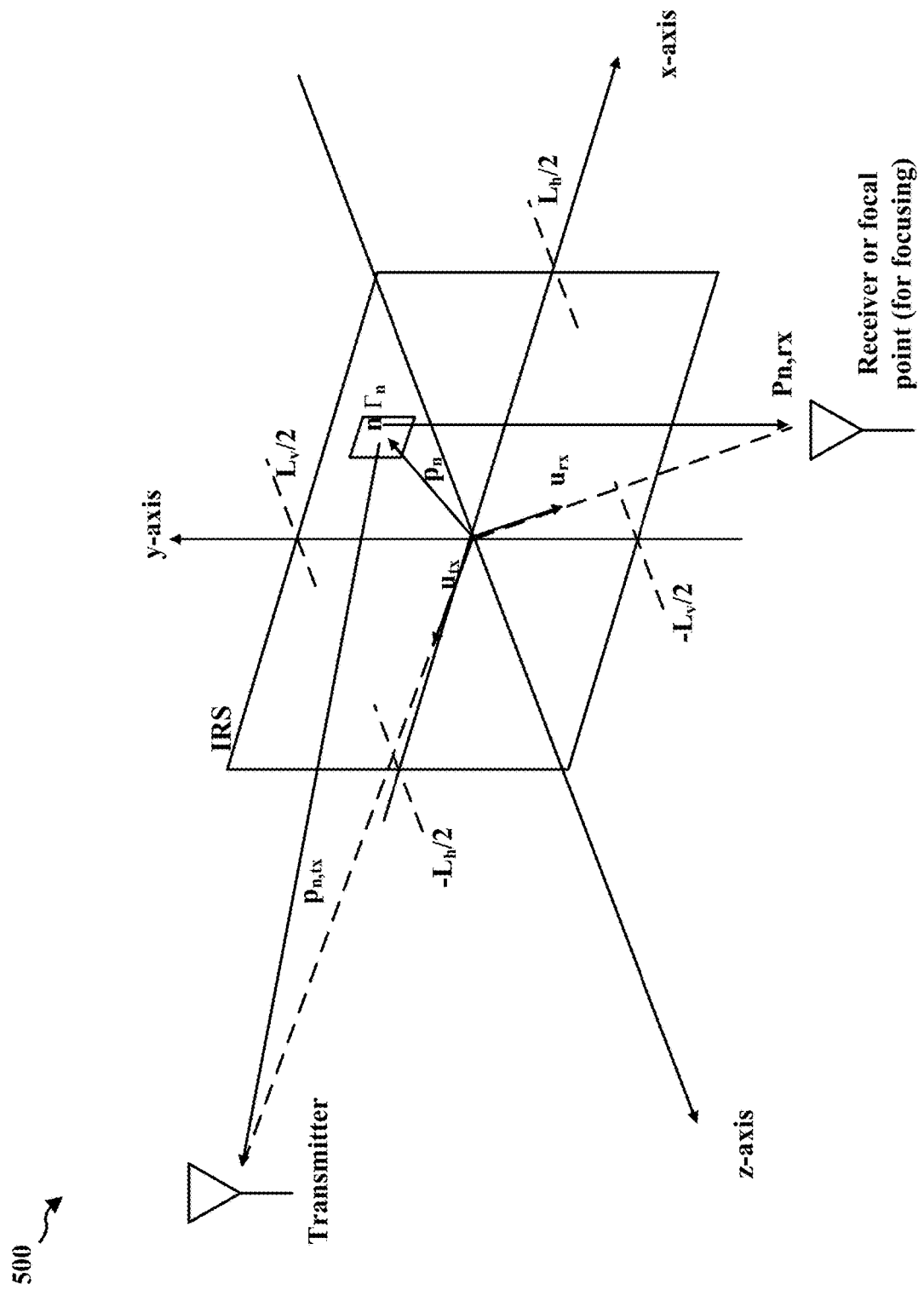
FIG. 5 is a diagram 500 illustrating various parameters involved in the focusing operation of an IRS.

FIG. 5 is a diagram 500 illustrating various parameters involved in the focusing operation of an IRS. As illustrated, $p_{n,tx}$ may be a vector from the surface element n to the Tx point. $p_{n,rx}$ may be a vector from the surface element n to the Rx point. $p_n$ may be a vector from the origin to the surface element n. $u_{tx}$ may be a unit vector from the origin to the Tx point. $u_{rx}$ may be a unit vector from the origin to the Rx point. $\Gamma_n$ may be the reflection coefficient at the surface element n. To focus from the Tx point tx to the Rx point rx, $\Gamma_n = \exp(j2\pi(d_{n,tx}+d_{n,rx})/\lambda)$, where $d_{n,tx}=|p_{n,tx}|$ and $d_{n,rx}=|p_{n,rx}|$, and $\lambda$ is the operating wavelength.

One or more aspects may relate to various methods for beam squint mitigation for a reflected beam from an IRS. Beam squint may happen as a result of the surface phase of an IRS being set based on a particular wavelength (which may correspond to a particular frequency), which may result in unintended reflection in other frequencies within the transmission bandwidth. The effects of beam squint may include loss of energy and frequency domain distortion to the signal.

Figure 6A:
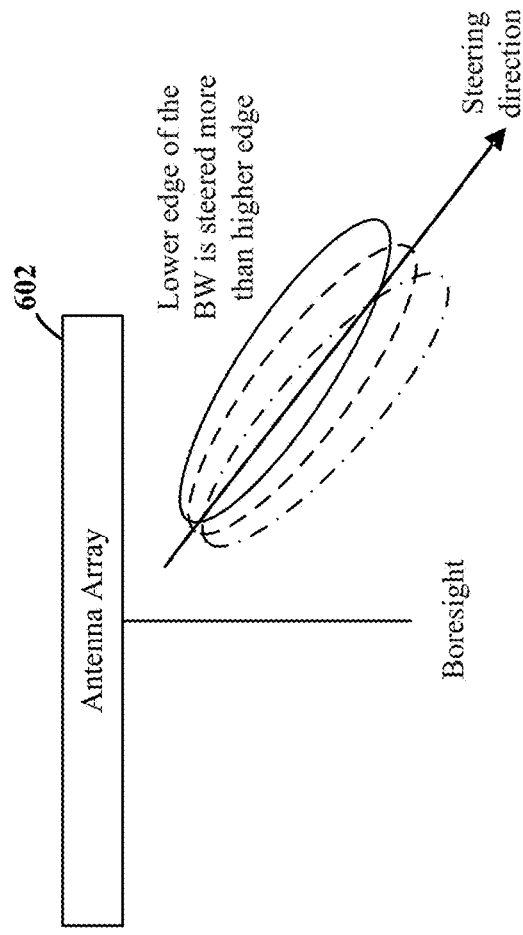
FIG. 6A is a diagram illustrating beam squint for an antenna array.
Figure 6B:
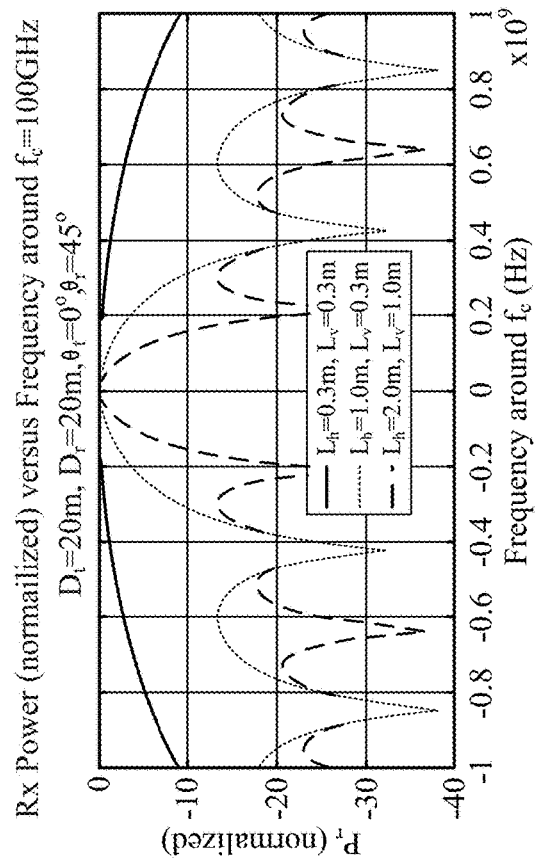
FIG. 6B is a diagram illustrating frequency domain distortion due to beam squint for a reflected beam from an IRS.

FIG. 6A is a diagram 600A illustrating beam squint for an antenna array. Signals at the lower frequencies (e.g., at the lower edge of the bandwidth) may be steered or deflected more by the antenna array 602 than the signals at the higher frequencies (e.g., at the higher edge of the bandwidth). FIG. 6B is a diagram 600B illustrating frequency domain distortion due to beam squint for a reflected beam from an IRS. In FIG. 6B, $f_c$ may be a center frequency. $D_t$ and $D_r$ may be the distances from the IRS to the transmitter and the receiver, respectively. $\theta_t$ and $\theta_r$ may be the angles between the z-axis (e.g., the axis perpendicular to the IRS) and the vectors from the center of the IRS to the transmitter and the receiver, respectively. Accordingly, $\theta_t$ and $\theta_r$ may correspond to the angle of incidence and the angle of reflection associated with the wireless signals, respectively. $L_h$ or $L_v$ may be the horizontal width and the vertical size of the active area of the IRS, respectively. As shown in FIG. 6B, the received reflected signal power at the receiver may change with respect to the signal frequency. This frequency domain distortion may be due to the beam squint associated with the IRS.

Beam squint may be aggravated by a large bandwidth, a large IRS size in the plane of incident and reflected beams, or a large difference between angles of incident and reflected beams. Accordingly, techniques for reducing beam squint may include bandwidth based mitigation, IRS size based mitigation, or angular difference based mitigation.

In order to beamform from an IRS to a receiver (e.g., a UE), the surface phase of the IRS may be properly set. Because the surface phase may depend on the wavelength, and the wavelength may change across a transmission bandwidth, undesired reflection directions may result for frequencies other than the one frequency corresponding to that wavelength based on which the surface phase is set. This may be the effect of beam squint. Beam squint may be related to the approximation of a true delay using a phase shift. Beam squint may cause loss of energy and frequency domain distortion.

Beam squint may be worsened by (i) a larger bandwidth, (ii) a larger array or IRS size (along the direction of the plane of incident and reflected beams), or (iii) a larger angular deviation from a normal reflection angle (where the incident and reflected beams are on opposite sides of the surface normal and the angles of the incident and reflected beams (with respect to the surface normal) are equal in magnitude).

Figure 7:
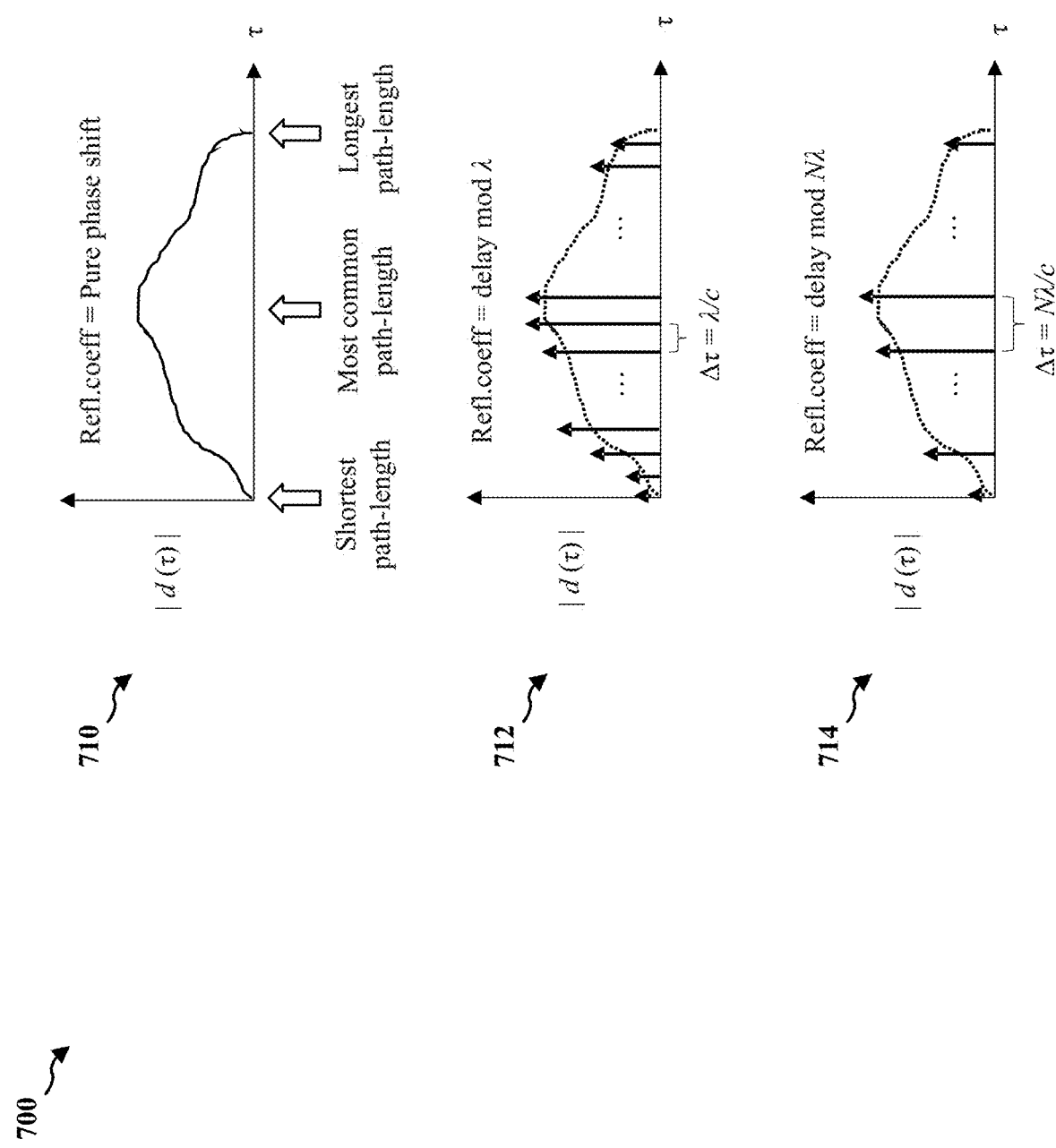
FIG. 7 is a diagram illustrating impulse responses of an IRS.

FIG. 7 is a diagram 700 illustrating impulse responses of an IRS. In FIG. 7, impulse responses of an IRS are illustrated for three different implementation approaches to the surface phase (e.g., a phase of the reflection coefficient) based on a pure phase shift or a delay. The impulse responses may represent a time domain view of beam squint. The diagram 710 shows an impulse response where the reflection coefficient is a pure phase shift. Here, the impulse response may be almost continuous in time, and may be given by (e.g., for a focused case): $d(\tau)=\text{histogram}(\{\tau_n: \text{base-station-UE delay through } n^{th} \text{ surface element}\})\times e^{j2\pi f_c \tau}$ The diagram 712 shows the impulse response where the reflection coefficient is delay-modulo-wavelength. Here, the impulse response may lump every wavelength (i.e., the $e^{j2\pi f_c \tau}$ term may disappear). The diagram 714 shows an impulse response where the reflection coefficient is delay-modulo-N-wavelengths. Here, the impulse response may lump every N wavelengths (N may be an integer), and the frequency response may be better than that associated with the continuous impulse response. If the reflection coefficient is a pure delay (not shown), the impulse response may lump into a pure impulse. Accordingly, no frequency domain distortion may occur.

In one or more configurations, to reduce beam squint, bandwidth based mitigation techniques may be used. For example, a narrower communication bandwidth may be used. The narrower bandwidth allocation may be compensated for by a larger number in the time domain symbol allocation (e.g., more time domain symbols may be allocated). The frequency of the BWP center or the center frequency of the transmission (such as the center of the PDSCH resource block allocation), instead of the frequency of the bandwidth center, may be used for the purpose of calculating the surface phase for the IRS.

In one or more configurations, to reduce beam squint, IRS size based beam squint mitigation techniques may be used. For example, the size of the IRS (or the size of the active area of the IRS) along the plane of incident and reflected beams may be kept as small as possible. The plane of incident and reflected beams may correspond to the horizontal width of the IRS, if the transmitter, the IRS, and the receiver are approximately on the same horizontal plane. It should be appreciated that the energy reflected by an IRS may be proportional to the size of the active area of the IRS reflecting the signals. Accordingly, to maintain a certain level of energy gain, when the horizontal width of the IRS is reduced, the vertical size of the IRS may be set to a larger value. Increasing the vertical size of the IRS may be less likely to cause beam squint.

In one or more configurations, to reduce beam squint, the angle difference between incident and reflected beams around the surface normal may be reduced to a possible minimum. The reflection may follow the Law of Reflection that applies to regular or specular reflection (i.e., the angle of incidence is equal to the angle of reflection). Accordingly, beam squint may be reduced or completely eliminated.

If multiple IRSs are available facing different directions, the IRS for which the angular difference between base-station-to-IRS and IRS-to-UE beams with respect to the surface normal is minimal (e.g., the signal reflection may be mirror-like (specular) reflection) may be chosen and used.

In one or more configurations, multiple IRSs or multiple subareas within an IRS may be used to beamform towards a UE, where each IRS or subarea may be configured for beamforming based on a different center frequency. Accordingly, under severe beam squint conditions, each beam (e.g., reflected from one of the multiple IRSs or IRS subareas) may provide energy for a different part of the bandwidth. Because the bandwidth served by each IRS or IRS subarea is narrow, beam squint may be reduced.

Figure 8:
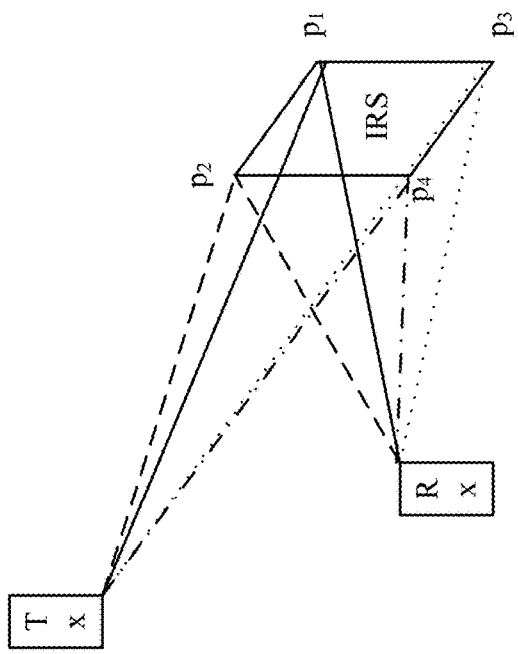
FIG. 8 is a diagram illustrating a delay spread associated with an IRS.

FIG. 8 is a diagram 800 illustrating a delay spread associated with an IRS. A time domain representation of beam squint may be:

$$h(\tau)=p(\tau)*d(\tau),$$

where $p(\tau)$ is the effective pulse shape of the communication signal (the width of $p(\tau)$ may be inversely proportional to the signal bandwidth, and may be assumed not subject to beam squint-related optimization), and $d(\tau)$ is related to the delay histogram of the reflected rays from the IRS. The width of $d(\tau)$ may be proportional to the delay spread (e.g., the delay spread may be estimated based on calculating $\max\{d_i, i=1, \ldots, 4\}-\min\{d_i, i=1, \ldots, 4\}$, where $d_i$ may represent path lengths through four corners of the IRS denoted by $p_i$, $i=1, \ldots, 4$, as illustrated in FIG. 8). $d(\tau)$ may be a function of the beam squint optimization parameters $L_h$ (the horizontal width of the active area of the IRS) and $L_v$ (the vertical size of the active area of the IRS). It should be noted that $p_1=(L_h/2, L_v/2)$, $p_2=(-L_h/2, L_v/2)$, $p_3=(L_h/2, -L_v/2)$, $p_4=(-L_h/2, -L_v/2)$. $d(\tau)$ may also be a function of incident and reflected beam angles, which may not be subject to optimization.

The optimization problem may be formulated as a minimization of the width of $h(\tau)$ with respect to $(L_h, L_v)$ subject to an energy constraint $L_h \times L_v$=Area (which may be a specified constant). Therefore, $L_h$ may be the parameter to optimize, since $L_v$=Area/$L_h$. A penalty term may be added for $L_h+L_v$ to avoid an extreme $L_h/L_v$ ratio for an incremental (small or marginal) benefit in beam squint mitigation.

A number of observations may be made. If $d(\tau)$ is much narrower than $p(\tau)$, the optimization may have little effect. Accordingly, further optimization may be penalized. If the width of $d(\tau)$ is greater than a fraction of the width of $p(\tau)$, then a $(L_h, L_v)$ pair may be chosen to minimize the width of $h(\tau)$, subject to the constraint of the constant area: $L_h \times L_v$=Area.

Therefore, based on an optimization algorithm, $L_h$ may be chosen to minimize: (width_d/width_p)+k $(L_h/\text{Area}^{1/2}+\text{Area}^{1/2}/L_h)/2$, where k $(L_h/\text{Area}^{1/2}+\text{Area}^{1/2}/L_h)/2$ is a penalty term. In particular, width_d may be an appropriate measure of the width of $d(\tau)$. For example, width_d=$\max\{d_1, d_2, d_3, d_4\}-\min\{d_1, d_2, d_3, d_4\}$. width_p may be an appropriate measure of the width of $p(\tau)$. For example, width_p=1/BW, where BW is an appropriate measure of the signal bandwidth, such as the carrier bandwidth or the bandwidth allocated for a single PDSCH transmission, etc. k may be a parameter that may represent the weight of the penalty term. Area may be a constant chosen for the desired pathloss specification for a UE. The penalty term may be chosen so that the value of k may be set with relative independence from the constant Area. Once $L_h$ is obtained, $L_v$ may be given by $L_v$=Area/$L_h$.

Figure 9:
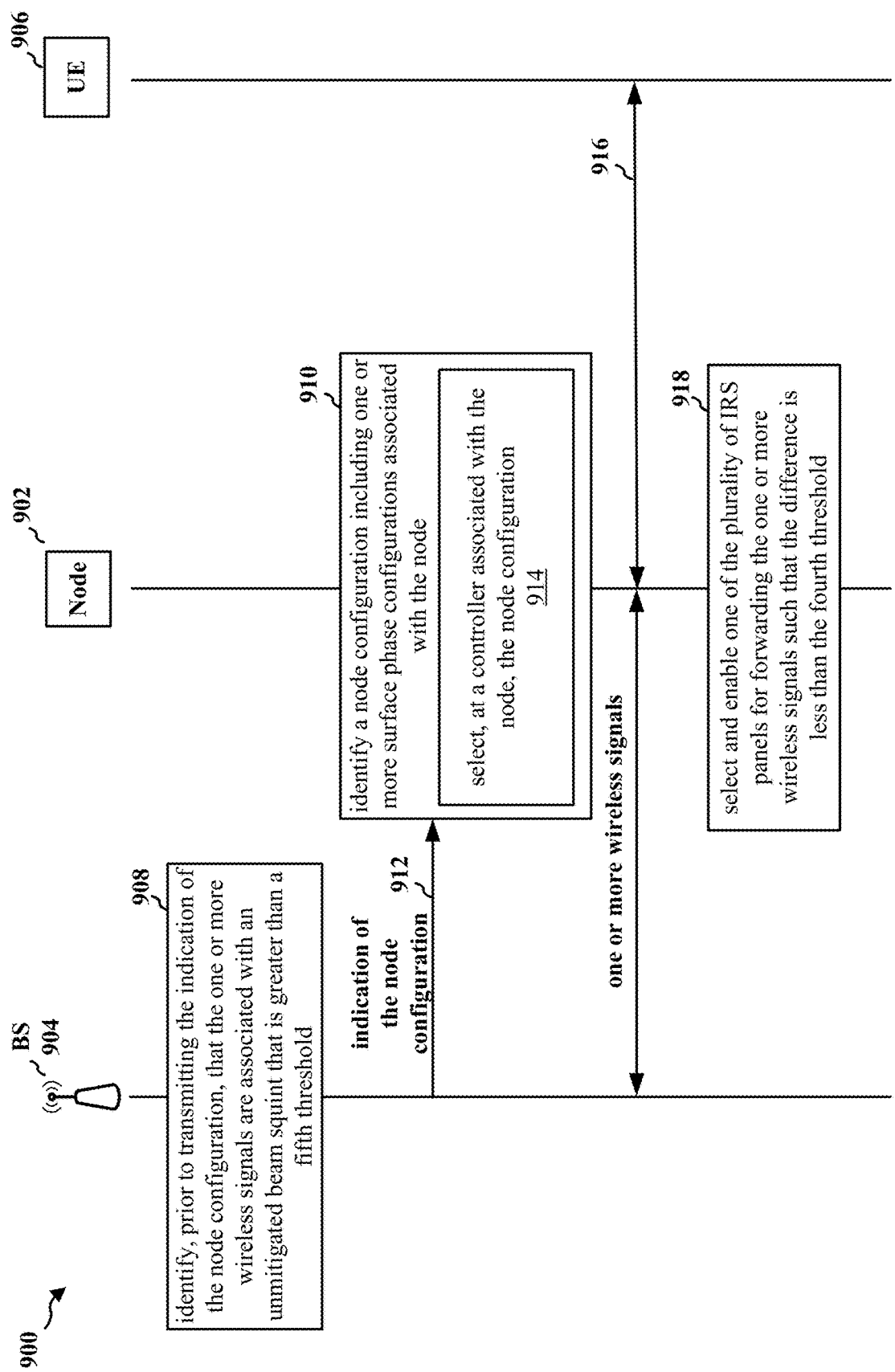
FIG. 9 is a diagram of a communication flow of a method of wireless communication.

FIG. 9 is a diagram of a communication flow 900 of a method of wireless communication. At 908, the base station 904 may identify, prior to transmitting the indication of the node configuration, that the one or more wireless signals are associated with an unmitigated beam squint that is greater than a fifth threshold.

At 910, the node 902 may identify a node configuration including one or more surface phase configurations associated with the node 902.

At 912, the node 902 may receive, from the base station 904, an indication of the node configuration.

Alternatively, at 914, the node 902 may select, at a controller associated with the node 902, the node configuration.

In one configuration, the one or more surface phase configurations may be based on a wavelength corresponding to a center of a BWP associated with the one or more wireless signals or a wavelength corresponding to a center of a resource allocation associated with the one or more wireless signals.

In one configuration, a bandwidth associated with the one or more wireless signals may be less than a second threshold.

In one configuration, a size of an IRS panel associated with the node 902 along a plane of signal propagation may be less than a third threshold.

In one configuration, based on the node 902 configuration, a size of an enabled subarea of an IRS panel associated with the node 902 along a plane of signal propagation may be less than a third threshold.

In one configuration, a length or a width of the enabled subarea of the IRS panel associated with the node 902 may be identified based on a minimization of a function. The function may be associated with at least one of a delay spread associated with the one or more wireless signals, a bandwidth associated with the one or more wireless signals, a penalty term, a total energy reflected by the IRS panel, or an area of the enabled subarea of the IRS.

In one configuration, a difference between an angle of incidence at the node 902 associated with the one or more wireless signals and an angle of reflection at the node 902 associated with the one or more wireless signals may be less than a fourth threshold.

In one configuration, the node 902 may be associated with a plurality of IRS panels. The node 902 may select and enable one of the plurality of IRS panels for forwarding the one or more wireless signals such that the difference between an angle of incidence associated with the one or more wireless signals and an angle of reflection associated with the one or more wireless signals is less than the fourth threshold.

In one configuration, the node 902 may be associated with a plurality of IRS panels or a plurality of IRS panel subareas concurrently enabled for forwarding the one or more wireless signals. The one or more surface phase configurations may include a plurality of surface phase configurations for the plurality of IRS panels or the plurality of IRS panel subareas. Each of the plurality of IRS panels or the plurality of IRS panel subareas may be associated with a respective one of the plurality of surface phase configurations based on a respective part of a bandwidth associated with the one or more wireless signals.

In one configuration, the node 902 may be associated with one or more IRS panels.

At 916, the node 902 may forward, from a base station 904 to a UE 906, or from the UE 906 to the base station 904, one or more wireless signals. The forwarded one or more wireless signals may be associated with a beam squint less than a first threshold.

At 918, the node 902 may select and enable one of the plurality of IRS panels for forwarding the one or more wireless signals such that the difference between an angle of incidence associated with the one or more wireless signals and an angle of reflection associated with the one or more wireless signals is less than the fourth threshold.

Figure 10:
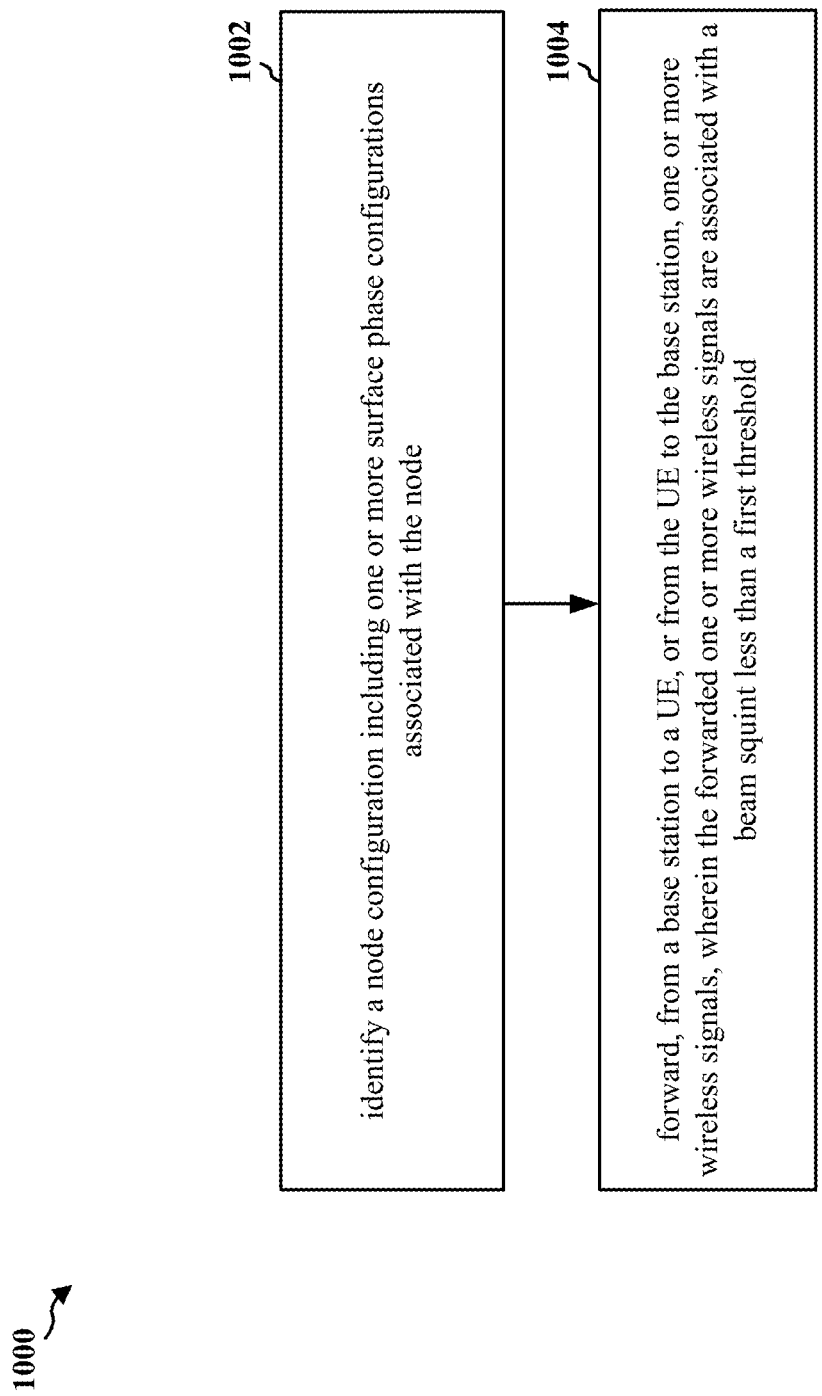
FIG. 10 is a flowchart of a method of wireless communication.

FIG. 10 is a flowchart 1000 of a method of wireless communication. The method may be performed by a node (e.g., the node/IRS 103/902; the apparatus 1402). At 1002, the node may identify a node configuration including one or more surface phase configurations associated with the node. For example, 1002 may be performed by the beam squint mitigation component 1440 in FIG. 14. Referring to FIG. 9, at 910, the node 902 may identify a node configuration including one or more surface phase configurations associated with the node 902.

At 1004, the node may forward, from a base station to a UE, or from the UE to the base station, one or more wireless signals. The forwarded one or more wireless signals may be associated with a beam squint less than a first threshold. For example, 1004 may be performed by the beam squint mitigation component 1440 in FIG. 14. Referring to FIG. 9, at 916, the node 902 may forward, from a base station 904 to a UE 906, or from the UE 906 to the base station 904, one or more wireless signals.

Figure 11:
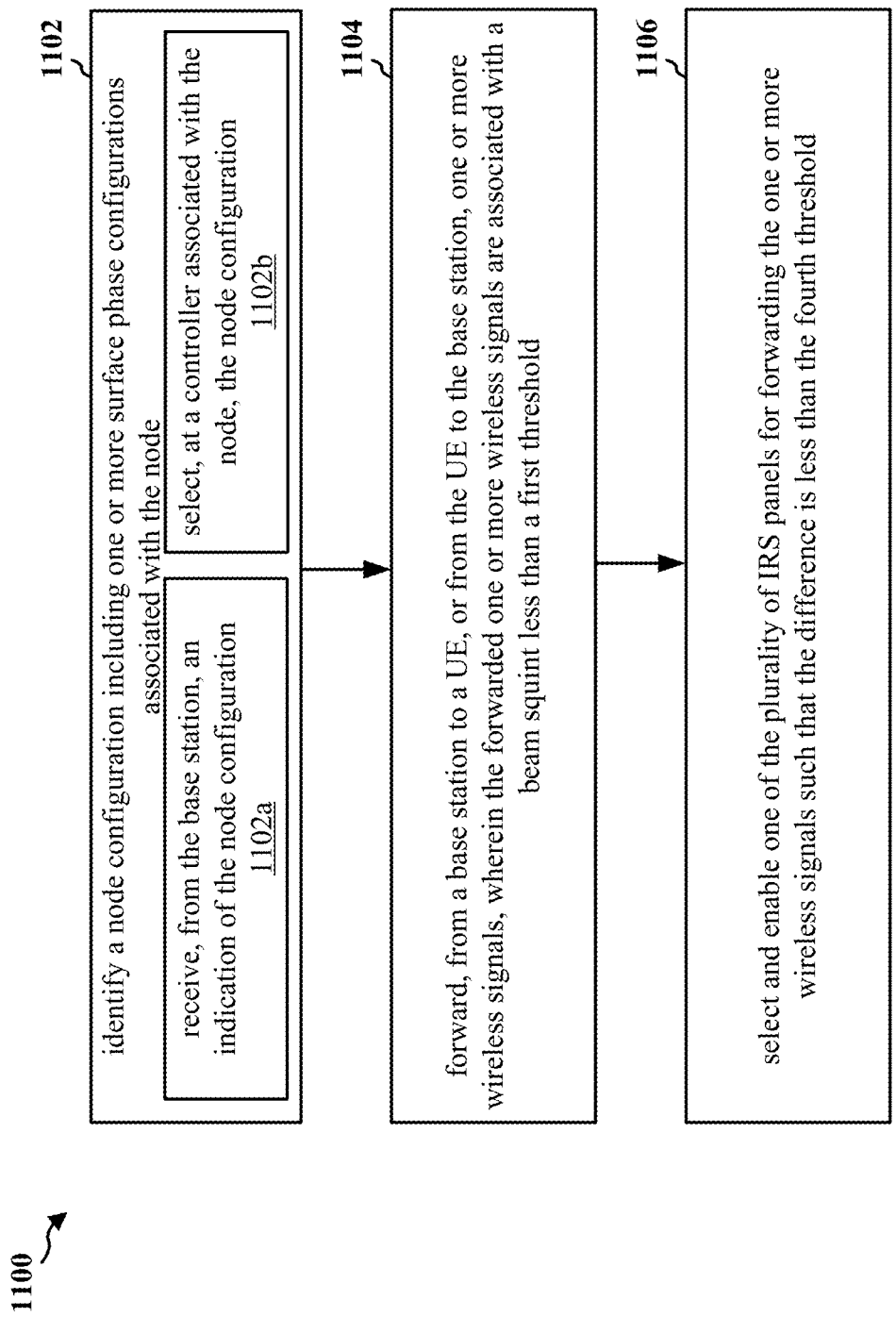
FIG. 11 is a flowchart of a method of wireless communication.

FIG. 11 is a flowchart 1100 of a method of wireless communication. The method may be performed by a node (e.g., the node/IRS 103/902; the apparatus 1402). At 1102, the node may identify a node configuration including one or more surface phase configurations associated with the node. For example, 1102 may be performed by the beam squint mitigation component 1440 in FIG. 14. Referring to FIG. 9, at 910, the node 902 may identify a node configuration including one or more surface phase configurations associated with the node 902.

At 1104, the node may forward, from a base station to a UE, or from the UE to the base station, one or more wireless signals. The forwarded one or more wireless signals may be associated with a beam squint less than a first threshold. For example, 1104 may be performed by the beam squint mitigation component 1440 in FIG. 14. Referring to FIG. 9, at 916, the node 902 may forward, from a base station 904 to a UE 906, or from the UE 906 to the base station 904, one or more wireless signals.

In one configuration, to identify the one or more surface phase configurations, at 1102a, the node may receive, from the base station, an indication of the node configuration. For example, 1102a may be performed by the beam squint mitigation component 1440 in FIG. 14. Referring to FIG. 9, at 912, the node 902 may receive, from the base station 904, an indication of the node configuration.

In one configuration, to identify the one or more surface phase configurations, at 1102b, the node may select, at a controller associated with the node, the node configuration. For example, 1102b may be performed by the beam squint mitigation component 1440 in FIG. 14. Referring to FIG. 9, at 914, the node 902 may select, at a controller associated with the node 902, the node configuration.

In one configuration, the one or more surface phase configurations may be based on a wavelength corresponding to a center of a BWP associated with the one or more wireless signals or a wavelength corresponding to a center of a resource allocation associated with the one or more wireless signals.

In one configuration, a bandwidth associated with the one or more wireless signals may be less than a second threshold.

In one configuration, a size of an IRS panel associated with the node along a plane of signal propagation may be less than a third threshold.

In one configuration, based on the node configuration, a size of an enabled subarea of an IRS panel associated with the node along a plane of signal propagation may be less than a third threshold.

In one configuration, a length or a width of the enabled subarea of the IRS panel associated with the node may be identified based on a minimization of a function. The function may be associated with at least one of a delay spread associated with the one or more wireless signals, a bandwidth associated with the one or more wireless signals, a penalty term, a total energy reflected by the IRS panel, or an area of the enabled subarea of the IRS.

In one configuration, a difference between an angle of incidence at the node associated with the one or more wireless signals and an angle of reflection at the node associated with the one or more wireless signals may be less than a fourth threshold.

In one configuration, the node may be associated with a plurality of IRS panels. At 1106, the node may select and enable one of the plurality of IRS panels for forwarding the one or more wireless signals such that the difference is less than the fourth threshold. For example, 1106 may be performed by the beam squint mitigation component 1440 in FIG. 14. Referring to FIG. 9, at 918, the node 902 may select and enable one of the plurality of IRS panels for forwarding the one or more wireless signals such that the difference is less than the fourth threshold.

In one configuration, the node may be associated with a plurality of IRS panels or a plurality of IRS panel subareas concurrently enabled for forwarding the one or more wireless signals. The one or more surface phase configurations may include a plurality of surface phase configurations for the plurality of IRS panels or the plurality of IRS panel subareas. Each of the plurality of IRS panels or the plurality of IRS panel subareas may be associated with a respective one of the plurality of surface phase configurations based on a respective part of a bandwidth associated with the one or more wireless signals.

In one configuration, the node may be associated with one or more IRS panels.

Figure 12:
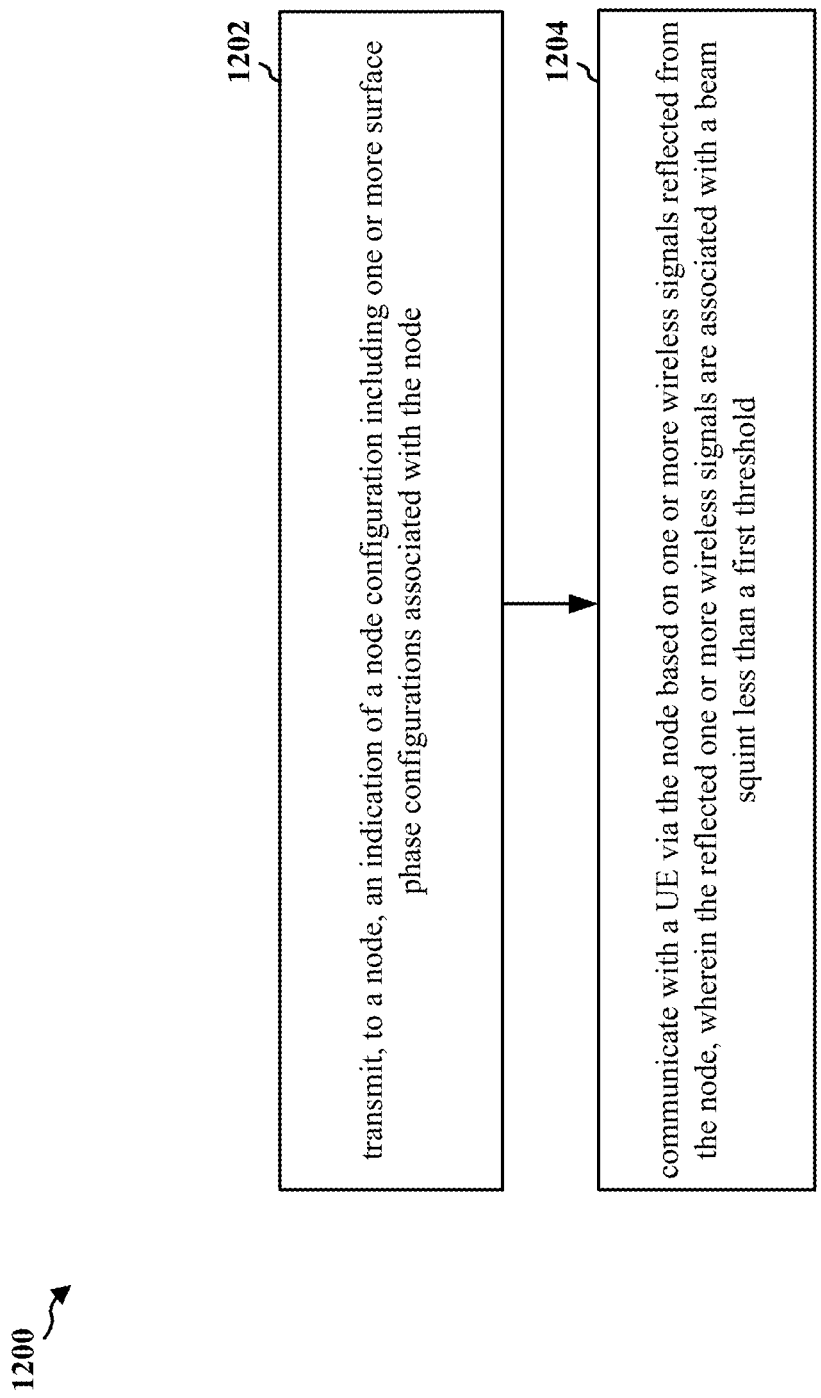
FIG. 12 is a flowchart of a method of wireless communication.

FIG. 12 is a flowchart 1200 of a method of wireless communication. The method may be performed by a base station (e.g., the base station 102/180/310/904; the apparatus 1502). At 1202, the base station may transmit, to a node, an indication of a node configuration including one or more surface phase configurations associated with the node. For example, 1202 may be performed by the beam squint mitigation component 1540 in FIG. 15. Referring to FIG. 9, at 912, the base station 904 may transmit, to a node 902, an indication of a node configuration including one or more surface phase configurations associated with the node 902.

At 1204, the base station may communicate with a UE via the node based on one or more wireless signals reflected from the node. The reflected one or more wireless signals may be associated with a beam squint less than a first threshold. For example, 1204 may be performed by the beam squint mitigation component 1540 in FIG. 15. Referring to FIG. 9, at 916, the base station 904 may communicate with a UE 906 via the node 902 based on one or more wireless signals reflected from the node 902.

Figure 13:
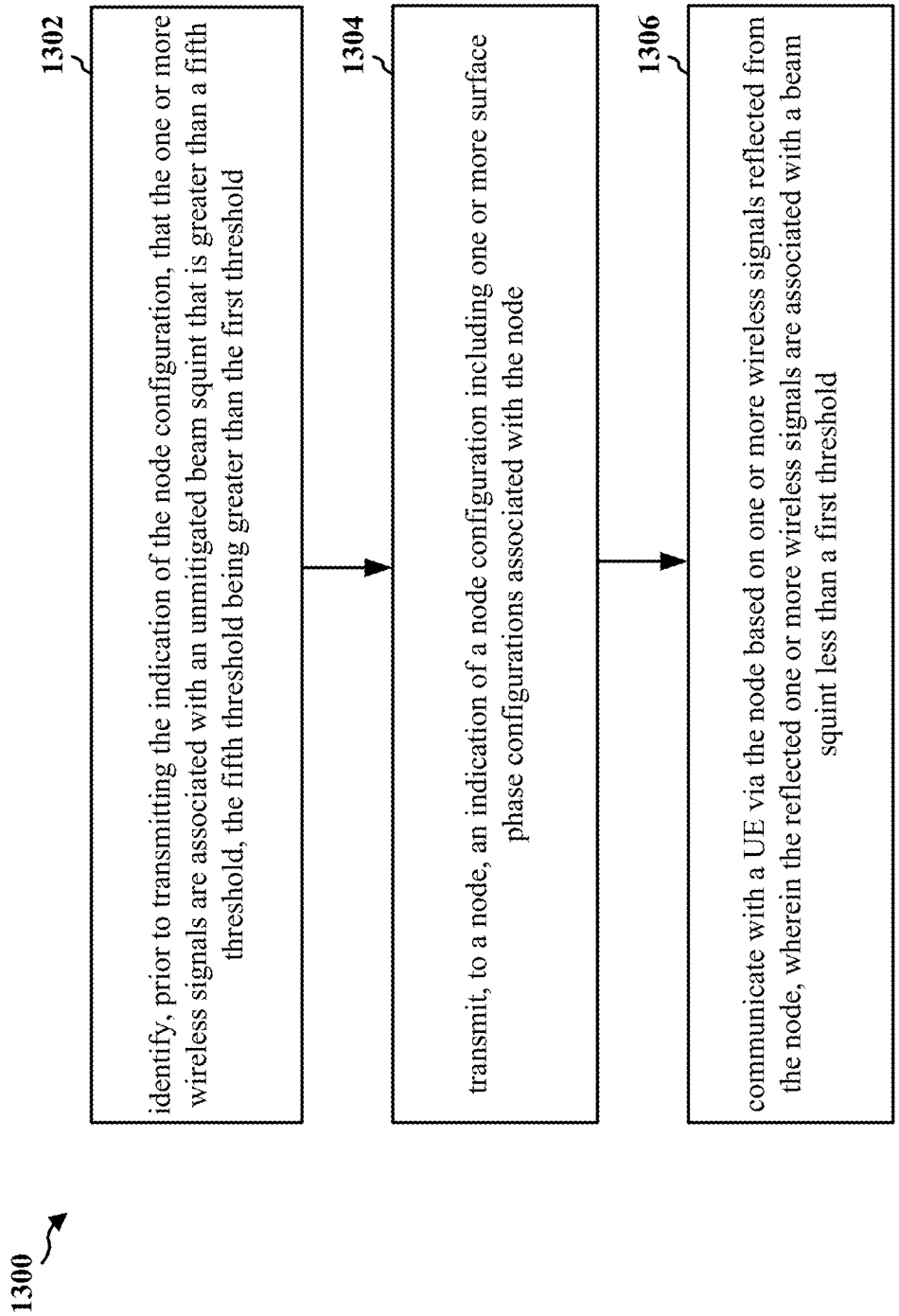
FIG. 13 is a flowchart of a method of wireless communication.

FIG. 13 is a flowchart 1300 of a method of wireless communication. The method may be performed by a base station (e.g., the base station 102/180/310/904; the apparatus 1502). At 1304 the base station may transmit, to a node, an indication of a node configuration including one or more surface phase configurations associated with the node. For example, 1304 may be performed by the beam squint mitigation component 1540 in FIG. 15. Referring to FIG. 9, at 912, the base station 904 may transmit, to a node 902, an indication of a node configuration including one or more surface phase configurations associated with the node 902.

At 1306, the base station may communicate with a UE via the node based on one or more wireless signals reflected from the node. The reflected one or more wireless signals may be associated with a beam squint less than a first threshold. For example, 1306 may be performed by the beam squint mitigation component 1540 in FIG. 15. Referring to FIG. 9, at 916, the base station 904 may communicate with a UE 906 via the node 902 based on one or more wireless signals reflected from the node 902.

In one configuration, at 1302, the base station may identify, prior to transmitting the indication of the node configuration, that the one or more wireless signals are associated with an unmitigated beam squint that is greater than a fifth threshold. The fifth threshold may be greater than the first threshold. For example, 1302 may be performed by the beam squint mitigation component 1540 in FIG. 15. Referring to FIG. 9, at 908, the base station 904 may identify, prior to transmitting the indication of the node configuration, that the one or more wireless signals are associated with an unmitigated beam squint that is greater than a fifth threshold.

In one configuration, the one or more surface phase configurations may be based on a wavelength corresponding to a center of a BWP associated with the one or more wireless signals or a wavelength corresponding to a center of a resource allocation associated with the one or more wireless signals.

In one configuration, a bandwidth associated with the one or more wireless signals may be less than a second threshold.

In one configuration, a size of an IRS panel associated with the node along a plane of signal propagation may be less than a third threshold.

In one configuration, based on the node configuration, a size of an enabled subarea of an IRS panel associated with the node along a plane of signal propagation may be less than a third threshold.

In one configuration, a length or a width of the enabled subarea of the IRS panel associated with the node may be identified based on a minimization of a function. The function may be associated with at least one of a delay spread associated with the one or more wireless signals, a bandwidth associated with the one or more wireless signals, a penalty term, a total energy reflected by the IRS panel, or an area of the enabled subarea of the IRS.

In one configuration, a difference between an angle of incidence at the node associated with the one or more wireless signals and an angle of reflection at the node associated with the one or more wireless signals may be less than a fourth threshold.

In one configuration, the node may be associated with a plurality of IRS panels. Based on the node configuration, one of the plurality of IRS panels may be active for forwarding the one or more wireless signals such that the difference is less than the fourth threshold.

In one configuration, the node may be associated with a plurality of IRS panels or a plurality of IRS panel subareas concurrently enabled for forwarding the one or more wireless signals. The one or more surface phase configurations may include a plurality of surface phase configurations for the plurality of IRS panels or the plurality of IRS panel subareas. Each of the plurality of IRS panels or the plurality of IRS panel subareas may be associated with a respective one of the plurality of surface phase configurations based on a respective part of a bandwidth associated with the one or more wireless signals.

In one configuration, the node may be associated with one or more IRS panels.

Figure 14:
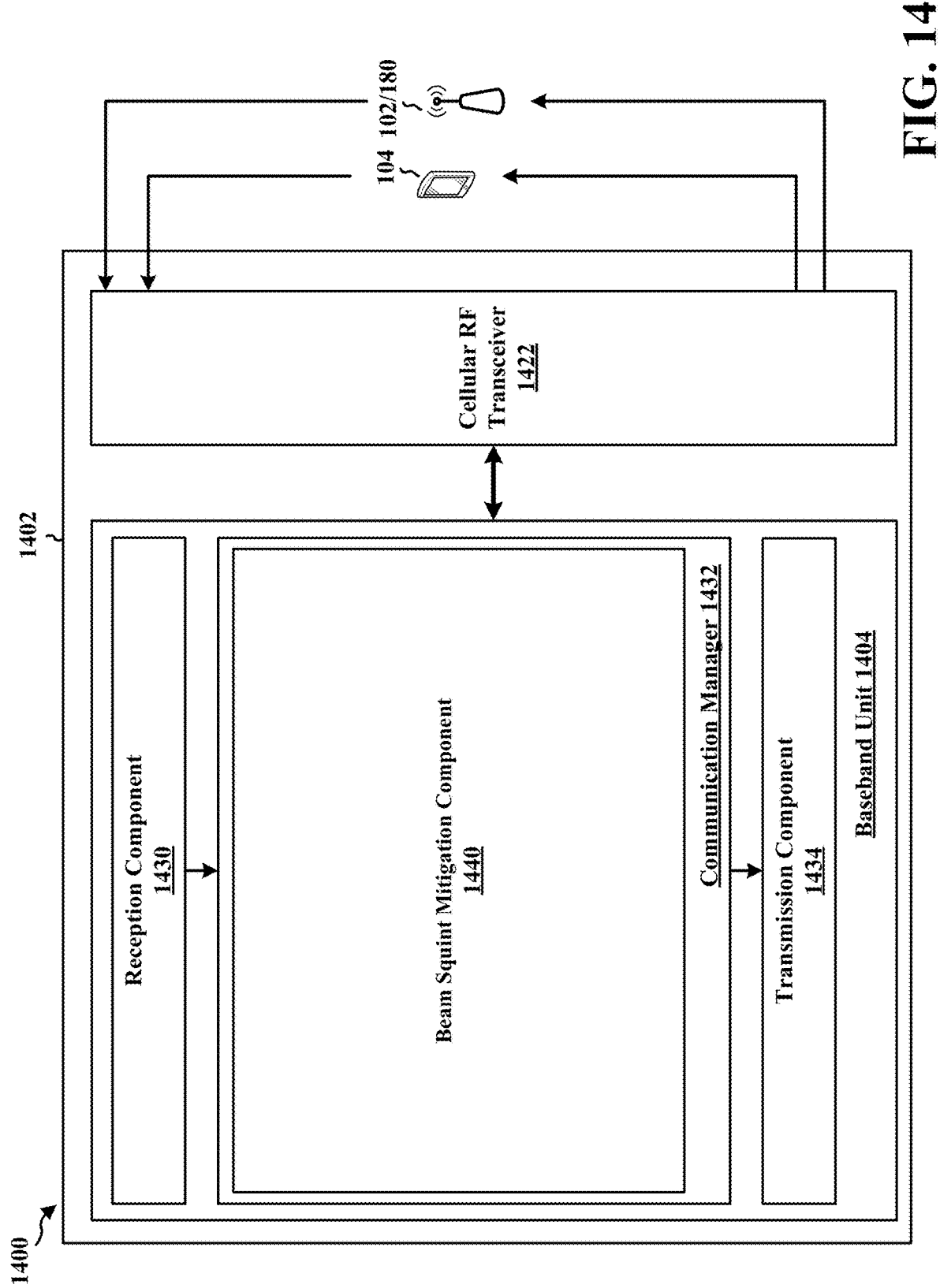
FIG. 14 is a diagram illustrating an example of a hardware implementation for an example apparatus.

FIG. 14 is a diagram 1400 illustrating an example of a hardware implementation for an apparatus 1402. The apparatus 1402 may be a node/IRS, a component of a node, or may implement node functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404.

The communication manager 1432 may include a beam squint mitigation component 1440 that may be configured to identify a node configuration including one or more surface phase configurations associated with the node, e.g., as described in connection with 1002 in FIGS. 10 and 1102 in FIG. 11. The beam squint mitigation component 1440 may be configured to receive, from the base station, an indication of the node configuration, e.g., as described in connection with 1102a in FIG. 11. The beam squint mitigation component 1440 may be configured to select, at a controller associated with the node, the node configuration, e.g., as described in connection with 1102b in FIG. 11. The beam squint mitigation component 1440 may be configured to forward, from a base station to a UE, or from the UE to the base station, one or more wireless signals, e.g., as described in connection with 1004 in FIGS. 10 and 1104 in FIG. 11. The beam squint mitigation component 1440 may be configured to select and enable one of the plurality of IRS panels for forwarding the one or more wireless signals such that the difference is less than the fourth threshold, e.g., as described in connection with 1106 in FIG. 11.

The apparatus may include additional components that perform each of the blocks of the algorithm in the flowcharts of FIGS. 9-11. As such, each block in the flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for identifying a node configuration including one or more surface phase configurations associated with the node. The apparatus 1402, and in particular the baseband unit 1404, includes means for forwarding, from a base station to a UE, or from the UE to the base station, one or more wireless signals. The forwarded one or more wireless signals may be associated with a beam squint less than a first threshold.

In one configuration, to identify the one or more surface phase configurations, apparatus 1402, and in particular the baseband unit 1404, includes means for receiving, from the base station, an indication of the node configuration. In one configuration, to identify the one or more surface phase configurations, apparatus 1402, and in particular the baseband unit 1404, includes means for selecting, at a controller associated with the node, the node configuration. In one configuration, the one or more surface phase configurations may be based on a wavelength corresponding to a center of a BWP associated with the one or more wireless signals or a wavelength corresponding to a center of a resource allocation associated with the one or more wireless signals. In one configuration, a bandwidth associated with the one or more wireless signals may be less than a second threshold. In one configuration, a size of an IRS panel associated with the node along a plane of signal propagation may be less than a third threshold. In one configuration, based on the node configuration, a size of an enabled subarea of an IRS panel associated with the node along a plane of signal propagation may be less than a third threshold. In one configuration, a length or a width of the enabled subarea of the IRS panel associated with the node may be identified based on a minimization of a function. The function may be associated with at least one of a delay spread associated with the one or more wireless signals, a bandwidth associated with the one or more wireless signals, a penalty term, a total energy reflected by the IRS panel, or an area of the enabled subarea of the IRS. In one configuration, a difference between an angle of incidence at the node associated with the one or more wireless signals and an angle of reflection at the node associated with the one or more wireless signals may be less than a fourth threshold. In one configuration, the node may be associated with a plurality of IRS panels. The apparatus 1402, and in particular the baseband unit 1404, includes means for selecting and enabling one of the plurality of IRS panels for forwarding the one or more wireless signals such that the difference is less than the fourth threshold. In one configuration, the node may be associated with a plurality of IRS panels or a plurality of IRS panel subareas concurrently enabled for forwarding the one or more wireless signals. The one or more surface phase configurations may include a plurality of surface phase configurations for the plurality of IRS panels or the plurality of IRS panel subareas. Each of the plurality of IRS panels or the plurality of IRS panel subareas may be associated with a respective one of the plurality of surface phase configurations based on a respective part of a bandwidth associated with the one or more wireless signals. In one configuration, the node may be associated with one or more IRS panels.

The means may be one or more of the components of the apparatus 1402 configured to perform the functions recited by the means.

Figure 15:
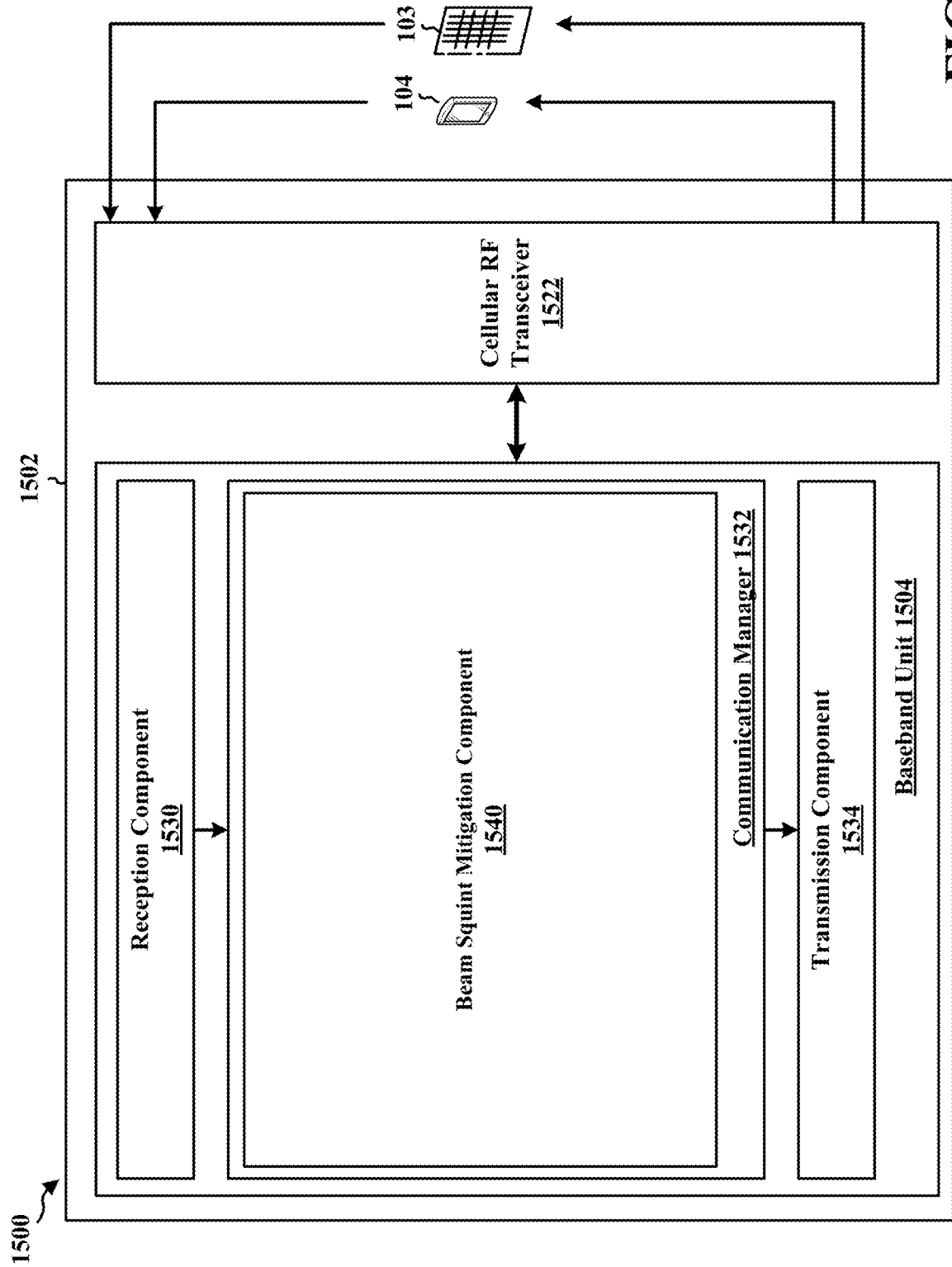
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 may include a beam squint mitigation component 1540 that may be configured to identify, prior to transmitting the indication of the node configuration, that the one or more wireless signals are associated with an unmitigated beam squint that is greater than a fifth threshold, e.g., as described in connection with 1302 in FIG. 13. The beam squint mitigation component 1540 may be configured to transmit, to a node, an indication of a node configuration including one or more surface phase configurations associated with the node, e.g., as described in connection with 1202 in FIGS. 12 and 1304 in FIG. 13. The beam squint mitigation component 1540 may be configured to communicate with a UE via the node based on one or more wireless signals reflected from the node, e.g., as described in connection with 1204 in FIGS. 12 and 1306 in FIG. 13.

The apparatus may include additional components that perform each of the blocks of the algorithm in the flowcharts of FIGS. 9, 12, and 13. As such, each block in the flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to a node, an indication of a node configuration including one or more surface phase configurations associated with the node. The apparatus 1502, and in particular the baseband unit 1504, includes means for communicating with a UE via the node based on one or more wireless signals reflected from the node. The reflected one or more wireless signals may be associated with a beam squint less than a first threshold.

In one configuration, the apparatus 1502, and in particular the baseband unit 1504, includes means for identifying, prior to transmitting the indication of the node configuration, that the one or more wireless signals are associated with an unmitigated beam squint that is greater than a fifth threshold. The fifth threshold may be greater than the first threshold. In one configuration, the one or more surface phase configurations may be based on a wavelength corresponding to a center of a BWP associated with the one or more wireless signals or a wavelength corresponding to a center of a resource allocation associated with the one or more wireless signals. In one configuration, a bandwidth associated with the one or more wireless signals may be less than a second threshold. In one configuration, a size of an IRS panel associated with the node along a plane of signal propagation may be less than a third threshold. In one configuration, based on the node configuration, a size of an enabled subarea of an IRS panel associated with the node along a plane of signal propagation may be less than a third threshold. In one configuration, a length or a width of the enabled subarea of the IRS panel associated with the node may be identified based on a minimization of a function. The function may be associated with at least one of a delay spread associated with the one or more wireless signals, a bandwidth associated with the one or more wireless signals, a penalty term, a total energy reflected by the IRS panel, or an area of the enabled subarea of the IRS. In one configuration, a difference between an angle of incidence at the node associated with the one or more wireless signals and an angle of reflection at the node associated with the one or more wireless signals may be less than a fourth threshold. In one configuration, the node may be associated with a plurality of IRS panels. Based on the node configuration, one of the plurality of IRS panels may be active for forwarding the one or more wireless signals such that the difference is less than the fourth threshold. In one configuration, the node may be associated with a plurality of IRS panels or a plurality of IRS panel subareas concurrently enabled for forwarding the one or more wireless signals. The one or more surface phase configurations may include a plurality of surface phase configurations for the plurality of IRS panels or the plurality of IRS panel subareas. Each of the plurality of IRS panels or the plurality of IRS panel subareas may be associated with a respective one of the plurality of surface phase configurations based on a respective part of a bandwidth associated with the one or more wireless signals. In one configuration, the node may be associated with one or more IRS panels.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-13, a node may identify a node configuration including one or more surface phase configurations associated with the node. In one configuration, the node may receive, from the base station, an indication of the node configuration. In another configuration, the node may select, at a controller associated with the node, the node configuration. The node may forward, from a base station to a UE, or from the UE to the base station, one or more wireless signals. The forwarded one or more wireless signals may be associated with a beam squint less than a first threshold. Various beam squint mitigation techniques have been described herein. Accordingly, the base station and the UE may communicate via the node without suffering from the drawbacks caused by beam squint.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a node including at least one processor coupled to a memory and configured to identify a node configuration including one or more surface phase configurations associated with the node; and forward, from a base station to a UE, or from the UE to the base station, one or more wireless signals, where the forwarded one or more wireless signals are associated with a beam squint less than a first threshold.

Aspect 2 is the apparatus of aspect 1, where to identify the one or more surface phase configurations, the at least one processor is further configured to: receive, from the base station, an indication of the node configuration.

Aspect 3 is the apparatus of aspect 1, where to identify the one or more surface phase configurations, the at least one processor is further configured to: select, at a controller associated with the node, the node configuration.

Aspect 4 is the apparatus of any of aspects 1 to 3, where the one or more surface phase configurations is based on a wavelength corresponding to a center of a BWP associated with the one or more wireless signals or a wavelength corresponding to a center of a resource allocation associated with the one or more wireless signals.

Aspect 5 is the apparatus of any of aspects 1 to 4, where a bandwidth associated with the one or more wireless signals is less than a second threshold.

Aspect 6 is the apparatus of any of aspects 1 to 5, where a size of an IRS panel associated with the node along a plane of signal propagation is less than a third threshold.

Aspect 7 is the apparatus of any of aspects 1 to 6, where based on the node configuration, a size of an enabled subarea of an IRS panel associated with the node along a plane of signal propagation is less than a third threshold.

Aspect 8 is the apparatus of aspect 7, where a length or a width of the enabled subarea of the IRS panel associated with the node is identified based on a minimization of a function, and the function is associated with at least one of a delay spread associated with the one or more wireless signals, a bandwidth associated with the one or more wireless signals, a penalty term, a total energy reflected by the IRS panel, or an area of the enabled subarea of the IRS.

Aspect 9 is the apparatus of any of aspects 1 to 8, where a difference between an angle of incidence at the node associated with the one or more wireless signals and an angle of reflection at the node associated with the one or more wireless signals is less than a fourth threshold.

Aspect 10 is the apparatus of aspect 9, where the node is associated with a plurality of IRS panels, and the at least one processor is further configured to: select and enable one of the plurality of IRS panels for forwarding the one or more wireless signals such that the difference is less than the fourth threshold.

Aspect 11 is the apparatus of any of aspects 1 to 10, where the node is associated with a plurality of IRS panels or a plurality of IRS panel subareas concurrently enabled for forwarding the one or more wireless signals, the one or more surface phase configurations include a plurality of surface phase configurations for the plurality of IRS panels or the plurality of IRS panel subareas, and each of the plurality of IRS panels or the plurality of IRS panel subareas is associated with a respective one of the plurality of surface phase configurations based on a respective part of a bandwidth associated with the one or more wireless signals.

Aspect 12 is the apparatus of any of aspects 1 to 11, where the node is associated with one or more IRS panels.

Aspect 13 is the apparatus of any of aspects 1 to 12, further including a transceiver coupled to the at least one processor.

Aspect 14 is an apparatus for wireless communication at a node including at least one processor coupled to a memory and configured to transmit, to a node, an indication of a node configuration including one or more surface phase configurations associated with the node; and communicate with a UE via the node based on one or more wireless signals reflected from the node, where the reflected one or more wireless signals are associated with a beam squint less than a first threshold.

Aspect 15 is the apparatus of aspect 14, the at least one processor being further configured to: identify, prior to transmitting the indication of the node configuration, that the one or more wireless signals are associated with an unmitigated beam squint that is greater than a fifth threshold, the fifth threshold being greater than the first threshold.

Aspect 16 is the apparatus of any of aspects 14 and 15, where the one or more surface phase configurations is based on a wavelength corresponding to a center of a BWP associated with the one or more wireless signals or a wavelength corresponding to a center of a resource allocation associated with the one or more wireless signals.

Aspect 17 is the apparatus of any of aspects 14 to 16, where a bandwidth associated with the one or more wireless signals is less than a second threshold.

Aspect 18 is the apparatus of any of aspects 14 to 17, where a size of an IRS panel associated with the node along a plane of signal propagation is less than a third threshold.

Aspect 19 is the apparatus of any of aspects 14 to 18, where based on the node configuration, a size of an enabled subarea of an IRS panel associated with the node along a plane of signal propagation is less than a third threshold.

Aspect 20 is the apparatus of aspect 19, where a length or a width of the enabled subarea of the IRS panel associated with the node is identified based on a minimization of a function, and the function is associated with at least one of a delay spread associated with the one or more wireless signals, a bandwidth associated with the one or more wireless signals, a penalty term, a total energy reflected by the IRS panel, or an area of the enabled subarea of the IRS.

Aspect 21 is the apparatus of any of aspects 14 to 20, where a difference between an angle of incidence at the node associated with the one or more wireless signals and an angle of reflection at the node associated with the one or more wireless signals is less than a fourth threshold.

Aspect 22 is the apparatus of aspect 21, where the node is associated with a plurality of IRS panels, and based on the node configuration, one of the plurality of IRS panels is active for forwarding the one or more wireless signals such that the difference is less than the fourth threshold.

Aspect 23 is the apparatus of any of aspects 14 to 22, where the node is associated with a plurality of IRS panels or a plurality of IRS panel subareas concurrently enabled for forwarding the one or more wireless signals, the one or more surface phase configurations include a plurality of surface phase configurations for the plurality of IRS panels or the plurality of IRS panel subareas, and each of the plurality of IRS panels or the plurality of IRS panel subareas is associated with a respective one of the plurality of surface phase configurations based on a respective part of a bandwidth associated with the one or more wireless signals.

Aspect 24 is the apparatus of any of aspects 14 to 23, where the node is associated with one or more IRS panels.

Aspect 25 is the apparatus of any of aspects 14 to 24, further including a transceiver coupled to the at least one processor.

Aspect 26 is a method of wireless communication for implementing any of aspects 1 to 25.

Aspect 27 is an apparatus for wireless communication including means for implementing any of aspects 1 to 25.

Aspect 28 is a computer-readable medium storing computer executable code, where the code when executed by a processor causes the processor to implement any of aspects 1 to 25.

What is claimed is:

1. An apparatus for wireless communication at a node, comprising:
   memory; and
   at least one processor coupled to the memory and configured to:
      identify a node configuration including one or more surface phase configurations associated with the node; and
      forward, from a base station to a user equipment (UE), or from the UE to the base station, one or more wireless signals, wherein the forwarded one or more wireless signals are associated with a beam squint less than a first threshold, and at least one of:
         identify a length or a width of an enabled subarea of an intelligent reflecting surface (IRS) panel associated with the node based on a minimization of a function, and the function is associated with at least one of a delay spread associated with the one or more wireless signals, a bandwidth associated with the one or more wireless signals, a penalty term, a total energy reflected by the IRS panel, or an area of the enabled subarea of the IRS,
         select and enable one of a plurality of IRS panels for forwarding the one or more wireless signals such that a difference between an angle of incidence at the node associated with the one or more wireless signals and an angle of reflection at the node associated with the one or more wireless signals is less than a second threshold, or
         wherein the node is associated with the plurality of IRS panels or a plurality of IRS panel subareas concurrently enabled for forwarding the one or more wireless signals, the one or more surface phase configurations include a plurality of surface phase configurations for the plurality of IRS panels or the plurality of IRS panel subareas, and each of the plurality of IRS panels or the plurality of IRS panel subareas is associated with a respective one of the plurality of surface phase configurations based on a respective part of the bandwidth associated with the one or more wireless signals.

2. The apparatus of claim 1, wherein to identify the node configuration including the one or more surface phase configurations, the at least one processor is further configured to:
   receive, from the base station, an indication of the node configuration.

3. The apparatus of claim 1, wherein to identify the node configuration including the one or more surface phase configurations, the at least one processor is further configured to:
   select, at a controller associated with the node, the node configuration.

4. The apparatus of claim 1, wherein the one or more surface phase configurations are based on a first wavelength corresponding to a center of a bandwidth part (BWP) associated with the one or more wireless signals or a second wavelength corresponding to a center of a resource allocation associated with the one or more wireless signals.

5. The apparatus of claim 1, wherein the bandwidth associated with the one or more wireless signals is less than a third threshold.

6. The apparatus of claim 1, wherein a size of the IRS panel associated with the node along a plane of signal propagation is less than a fourth threshold.

7. The apparatus of claim 1, wherein based on the node configuration, a size of the enabled subarea of the IRS panel associated with the node along a plane of signal propagation is less than a fourth threshold.

8. The apparatus of claim 7, wherein the length or the width of the enabled subarea of the IRS panel associated with the node is identified based on the minimization of the function, and the function is associated with at least one of the delay spread associated with the one or more wireless signals, the bandwidth associated with the one or more wireless signals, the penalty term, the total energy reflected by the IRS panel, or the area of the enabled subarea of the IRS.

9. The apparatus of claim 1, wherein the difference between the angle of incidence at the node associated with the one or more wireless signals and the angle of reflection at the node associated with the one or more wireless signals is less than the second threshold.

10. The apparatus of claim 9, wherein the node is associated with the plurality of IRS panels, and the at least one processor is further configured to:
    select and enable one of the plurality of IRS panels for forwarding the one or more wireless signals such that the difference is less than the second threshold.

11. The apparatus of claim 1, wherein the node is associated with the plurality of IRS panels or the plurality of IRS panel subareas concurrently enabled for forwarding the one or more wireless signals, the one or more surface phase configurations include the plurality of surface phase configurations for the plurality of IRS panels or the plurality of IRS panel subareas, and each of the plurality of IRS panels or the plurality of IRS panel subareas is associated with the respective one of the plurality of surface phase configurations based on the respective part of the bandwidth associated with the one or more wireless signals.

12. The apparatus of claim 1, wherein the node is associated with the IRS panel or the plurality of IRS panels.

13. The apparatus of claim 1, further comprising a transceiver coupled to the at least one processor.

14. A method of wireless communication at a node, comprising:
    identifying a node configuration including one or more surface phase configurations associated with the node; and
    forwarding, from a base station to a user equipment (UE), or from the UE to the base station, one or more wireless signals, wherein the forwarded one or more wireless signals are associated with a beam squint less than a first threshold, and at least one of:
       identifying a length or a width of an enabled subarea of an intelligent reflecting surface (IRS) panel associated with the node based on a minimization of a function, and the function is associated with at least one of a delay spread associated with the one or more wireless signals, a bandwidth associated with the one or more wireless signals, a penalty term, a total energy reflected by the IRS panel, or an area of the enabled subarea of the IRS,
       selecting and enabling one of a plurality of IRS panels for forwarding the one or more wireless signals such that a difference between an angle of incidence at the node associated with the one or more wireless signals and an angle of reflection at the node associated with the one or more wireless signals is less than a second threshold, or wherein the node is associated with the plurality of IRS panels or a plurality of IRS panel subareas concurrently enabled for forwarding the one or more wireless signals, the one or more surface phase configurations include a plurality of surface phase configurations for the plurality of IRS panels or the plurality of IRS panels or the plurality of IRS panel subareas is associated with a respective one of the plurality of surface phase configurations based on a respective part of the bandwidth associated with the one or more wireless signals.

15. The method of claim 14, wherein the one or more surface phase configurations is based on a first wavelength corresponding to a center of a bandwidth part (BWP) associated with the one or more wireless signals or a second wavelength corresponding to a center of a resource allocation associated with the one or more wireless signals.

16. An apparatus for wireless communication at a base station, comprising:
   memory; and
   at least one processor coupled to the memory and configured to:
      transmit, to a node, an indication of a node configuration including one or more surface phase configurations associated with the node; and
      communicate with a user equipment (UE) via the node based on one or more wireless signals reflected from the node, wherein the reflected one or more wireless signals are associated with a beam squint less than a first threshold, and at least one of:
         identify, prior to transmitting the indication of the node configuration, that the one or more wireless signals are associated with an unmitigated beam squint that is greater than a second threshold, the second threshold being greater than the first threshold;
         based on the node configuration, a size of an enabled subarea of an intelligent reflecting surface (IRS) panel associated with the node along a plane of signal propagation is less than a third threshold and a length or a width of the enabled subarea of the IRS panel associated with the node is configured to be identified based on a minimization of a function, and the function is associated with at least one of a delay spread associated with the one or more wireless signals, a bandwidth associated with the one or more wireless signals, a penalty term, a total energy reflected by the IRS panel, or an area of the enabled subarea of the IRS;
      wherein the node is associated with a plurality of intelligent reflecting surface (IRS) panels, and based on the node configuration, one of the plurality of IRS panels is active for forwarding the one or more wireless signals such that a difference between an angle of incidence at the node associated with the one or more wireless signals and an angle of reflection at the node associated with the one or more wireless signals is less than a fourth threshold, or
      wherein the node is associated with the plurality of IRS panels or a plurality of IRS panel subareas concurrently enabled for forwarding the one or more wireless signals, the one or more surface phase configurations include a plurality of surface phase configurations for the plurality of IRS panels or the plurality of IRS panel subareas, and each of the plurality of IRS panels or the plurality of IRS panel subareas is associated with a respective one of the plurality of surface phase configurations based on a respective part of the bandwidth associated with the one or more wireless signals.

17. The apparatus of claim 16, the at least one processor being further configured to:
   identify, prior to the transmission of the indication of the node configuration, that the one or more wireless signals are associated with the unmitigated beam squint that is greater than the second threshold, the second threshold being greater than the first threshold.

18. The apparatus of claim 16, wherein the one or more surface phase configurations is based on a first wavelength corresponding to a center of a bandwidth part (BWP) associated with the one or more wireless signals or a second wavelength corresponding to a center of a resource allocation associated with the one or more wireless signals.

19. The apparatus of claim 16, wherein the bandwidth associated with the one or more wireless signals is less than a fifth threshold.

20. The apparatus of claim 16, wherein the size of the IRS panel associated with the node along the plane of signal propagation is less than the third threshold.

21. The apparatus of claim 16, wherein based on the node configuration, the size of the enabled subarea of the IRS panel associated with the node along the plane of signal propagation is less than the third threshold.

22. The apparatus of claim 21, wherein the length or the width of the enabled subarea of the IRS panel associated with the node is identified based on the minimization of the function, and the function is associated with at least one of the delay spread associated with the one or more wireless signals, the bandwidth associated with the one or more wireless signals, the penalty term, the total energy reflected by the IRS panel, or the area of the enabled subarea of the IRS.

23. The apparatus of claim 16, wherein the difference between the angle of incidence at the node associated with the one or more wireless signals and the angle of reflection at the node associated with the one or more wireless signals is less than the fourth threshold.

24. The apparatus of claim 23, wherein the node is associated with the plurality of IRS panels, and based on the node configuration, one of the plurality of IRS panels is active for forwarding the one or more wireless signals such that the difference is less than the fourth threshold.

25. The apparatus of claim 16, wherein the node is associated with the plurality of IRS panels or the plurality of IRS panel subareas concurrently enabled for forwarding the one or more wireless signals, the one or more surface phase configurations include the plurality of surface phase configurations for the plurality of IRS panels or the plurality of IRS panel subareas, and each of the plurality of IRS panels or the plurality of IRS panel subareas is associated with the respective one of the plurality of surface phase configurations based on the respective part of the bandwidth associated with the one or more wireless signals.

26. The apparatus of claim 16, wherein the node is associated with the IRS panel or the plurality of IRS panels.

27. The apparatus of claim 16, further comprising a transceiver coupled to the at least one processor.

28. A method of wireless communication at a base station, comprising:
- transmitting, to a node, an indication of a node configuration including one or more surface phase configurations associated with the node; and
- communicating with a user equipment (UE) via the node based on one or more wireless signals reflected from the node, wherein the reflected one or more wireless signals are associated with a beam squint less than a first threshold, and at least one of:
  - identifying, prior to transmitting the indication of the node configuration, that the one or more wireless signals are associated with an unmitigated beam squint that is greater than a second threshold, the second threshold being greater than the first threshold;
  - based on the node configuration, a size of an enabled subarea of an intelligent reflecting surface (IRS) panel associated with the node along a plane of signal propagation is less than a third threshold and a length or a width of the enabled subarea of the IRS panel associated with the node is configured to be identified based on a minimization of a function, and the function is associated with at least one of a delay spread associated with the one or more wireless signals, a bandwidth associated with the one or more wireless signals, a penalty term, a total energy reflected by the IRS panel, or an area of the enabled subarea of the IRS;
  - wherein the node is associated with a plurality of intelligent reflecting surface (IRS) panels, and based on the node configuration, one of the plurality of IRS panels is active for forwarding the one or more wireless signals such that a difference between an angle of incidence at the node associated with the one or more wireless signals and an angle of reflection at the node associated with the one or more wireless signals is less than a fourth threshold, or
  - wherein the node is associated with the plurality of IRS panels or a plurality of IRS panel subareas concurrently enabled for forwarding the one or more wireless signals, the one or more surface phase configurations include a plurality of surface phase configurations for the plurality of IRS panels or the plurality of IRS panel subareas, and each of the plurality of IRS panels or the plurality of IRS panel subareas is associated with a respective one of the plurality of surface phase configurations based on a respective part of the bandwidth associated with the one or more wireless signals.

29. The method of claim 28, further comprising:
- identifying, prior to transmitting the indication of the node configuration, that the one or more wireless signals are associated with the unmitigated beam squint that is greater than the second threshold, the second threshold being greater than the first threshold.

30. The method of claim 28, wherein the one or more surface phase configurations is based on a first wavelength corresponding to a center of a bandwidth part (BWP) associated with the one or more wireless signals or a second wavelength corresponding to a center of a resource allocation associated with the one or more wireless signals.

* * * * *